United States Patent
Lu et al.

(10) Patent No.: US 11,864,227 B2
(45) Date of Patent: Jan. 2, 2024

(54) TRANSMISSION WITH PARTIAL BANDWIDTH SPECTRUM REUSE IN WIRELESS COMMUNICATIONS

(71) Applicant: MediaTek Singapore Pte. Ltd., Singapore (SG)

(72) Inventors: Kai Ying Lu, San Jose, CA (US); Jianhan Liu, San Jose, CA (US); Chao-Chun Wang, San Jose, CA (US); Yongho Seok, San Jose, CA (US); Thomas Edward Pare, Jr., San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 119 days.

(21) Appl. No.: 17/166,698

(22) Filed: Feb. 3, 2021

(65) Prior Publication Data

US 2021/0266960 A1    Aug. 26, 2021

Related U.S. Application Data

(60) Provisional application No. 63/070,859, filed on Aug. 27, 2020, provisional application No. 62/991,092, (Continued)

(51) Int. Cl.
*H04W 16/02* (2009.01)
*H04W 74/08* (2009.01)
(Continued)

(52) U.S. Cl.
CPC .......... *H04W 74/08* (2013.01); *H04W 16/02* (2013.01); *H04W 72/0453* (2013.01); *H04W 72/20* (2023.01)

(58) Field of Classification Search
CPC . H04W 74/08; H04W 16/02; H04W 72/0453; H04W 72/1278; H04W 74/006;
(Continued)

(56) References Cited

U.S. PATENT DOCUMENTS

| 2008/0013567 | A1* | 1/2008 | Benveniste | ............. H04W 8/04 370/447 |
| 2012/0063406 | A1 | 3/2012 | Seok | |

(Continued)

FOREIGN PATENT DOCUMENTS

| EP | 3188565 A1 * | 7/2017 | ............ H04W 74/08 |
| GB | 2549967 A * | 11/2017 | ........ H04W 72/0453 |

OTHER PUBLICATIONS

USPTO; Office Action for U.S. Appl. No. 17/166,715; dated Aug. 31, 2022.
(Continued)

*Primary Examiner* — Thai Nguyen
(74) *Attorney, Agent, or Firm* — Han IP PLLC; Andy M. Han

(57) ABSTRACT

A device detects a primary channel busy for an operating bandwidth having a plurality of channel segments comprising the primary channel and at least one non-primary channel. In response to detecting the primary channel busy, the device obtains a transmission opportunity (TXOP) through a first non-primary channel of the at least one non-primary channel. Then, the device performs a transmission at least on the first non-primary channel during the TXOP.

20 Claims, 28 Drawing Sheets

Related U.S. Application Data filed on Mar. 18, 2020, provisional application No. 62/984,345, filed on Mar. 3, 2020, provisional application No. 62/979,495, filed on Feb. 21, 2020.

(51) Int. Cl.
*H04W 72/0453* (2023.01)
*H04W 72/20* (2023.01)

(58) Field of Classification Search
CPC ............. H04W 74/0808; H04W 84/12; H04W 74/004; H04W 74/0816; H04W 72/12
See application file for complete search history.

(56) References Cited

U.S. PATENT DOCUMENTS

| | | |
|---|---|---|
| 2012/0327870 A1 | 12/2012 | Grandhi et al. |
| 2016/0157266 A1* | 6/2016 | Wang ................. H04W 74/004 370/336 |
| 2016/0381565 A1 | 12/2016 | Oteri et al. |
| 2017/0188336 A1* | 6/2017 | Ahn ................. H04W 74/0858 |
| 2019/0069324 A1 | 2/2019 | Ansari et al. |
| 2020/0413465 A1* | 12/2020 | Park ...................... H04W 76/15 |
| 2021/0391947 A1 | 12/2021 | Jang et al. |
| 2022/0174725 A1* | 6/2022 | Ciochina ............... H04W 84/12 |

OTHER PUBLICATIONS

USPTO; Office Action for U.S. Appl. No. 17/166,715; dated Dec. 29, 2022.

* cited by examiner

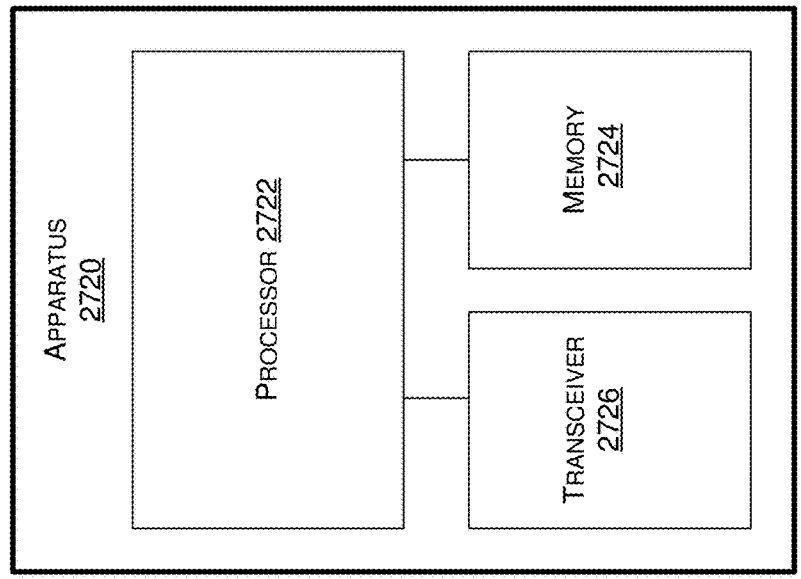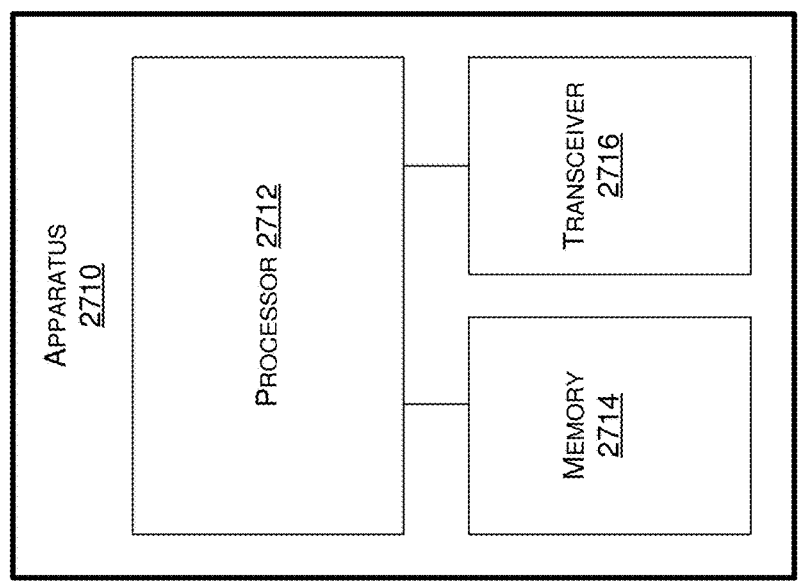
FIG. 27

2800

```
┌─────────────────────────────────────────┐
│ DETECT A PRIMARY CHANNEL BUSY FOR AN OPERATING │
│ BANDWIDTH HAVING A PLURALITY OF CHANNEL │
│ SEGMENTS COMPRISING THE PRIMARY CHANNEL AND AT │
│ LEAST ONE NON-PRIMARY CHANNEL           │
│ 2810                                    │
└─────────────────────────────────────────┘
                    │
                    ▼
┌─────────────────────────────────────────┐
│ OBTAIN A TRANSMISSION OPPORTUNITY (TXOP) │
│ THROUGH A FIRST NON-PRIMARY CHANNEL OF THE AT │
│ LEAST ONE NON-PRIMARY CHANNEL RESPONSIVE TO │
│ THE DETECTING                           │
│ 2820                                    │
└─────────────────────────────────────────┘
                    │
                    ▼
┌─────────────────────────────────────────┐
│ PERFORM A TRANSMISSION AT LEAST ON THE FIRST │
│ NON-PRIMARY CHANNEL DURING THE TXOP     │
│ 2830                                    │
└─────────────────────────────────────────┘
```

FIG. 28

TRANSMISSION WITH PARTIAL BANDWIDTH SPECTRUM REUSE IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 62/979,495, filed 21 Feb. 2020, U.S. Provisional Patent Application No. 62/984,345, filed 3 Mar. 2020, U.S. Provisional Patent Application No. 62/991,092, filed 18 Mar. 2020, and U.S. Provisional Patent Application No. 63/070,859, filed 27 Aug. 2020, the contents of which being incorporated by reference in their entirety.

TECHNICAL FIELD

The present disclosure is generally related to wireless communications and, more particularly, to transmission with partial bandwidth spectrum reuse in wireless communications.

BACKGROUND

Unless otherwise indicated herein, approaches described in this section are not prior art to the claims listed below and are not admitted as prior art by inclusion in this section.

In the context of wireless communications such as wireless local area network (WLANs) in accordance with one or more Institute of Electrical and Electronics Engineers (IEEE) 802.11 standards, a device in a contention-based channel access system can access a medium in a wideband, including multiple narrow bands (or channels), by sensing a primary channel and transmitting when the primary channel is idle. Under a dynamic bandwidth transmission scheme, the device is allowed to transmit frames on the primary and one or more non-primary channels which are idle. Additionally, with a preamble puncturing mechanism without puncturing the primary channel, usage of the spectrum is increased when there are radar signals, incumbent signals or overlapping basic service set (OBSS) interferences occurring in one or more non-primary channels.

In next-generation wireless communication systems in which a wider operating bandwidth (e.g., 320 MHz/160+160 MHz/240 MHz/160+80 MHz/160 MHz) is supported, channel contention is allowed on the primary channel but not on non-primary channels. In case the primary channel is overloaded or busy for channel contention, then no transmission would be allowed to result in the spectrum of the wideband channel being under-utilized. Therefore, there is a need for a solution to allow transmission with partial bandwidth spectrum reuse in wireless communications.

SUMMARY

The following summary is illustrative only and is not intended to be limiting in any way. That is, the following summary is provided to introduce concepts, highlights, benefits, and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods, and apparatuses to address aforementioned issues/problems. Under various schemes proposed herein, some rules pertaining to transmission with partial bandwidth spectrum reuse in wireless communications may be implemented to further increase spectrum reuse to allow multiple service sets to share wideband resources. For instance, when the primary channel is busy while one or more of the non-primary channels is/are idle, a device may be allowed to transmit on the unoccupied non-primary channel(s) in the wideband operating channels, thereby improving bandwidth utilization when the primary channel is not available.

In one aspect, a method may involve detecting a primary channel busy for an operating bandwidth having a plurality of channel segments comprising the primary channel and at least one non-primary channel. The method may also involve obtaining a transmission opportunity (TXOP) through a first non-primary channel of the at least one non-primary channel responsive to the detecting. The method may further involve performing a transmission at least on the first non-primary channel during the TXOP.

In another aspect, an apparatus may include a transceiver and a processor coupled to the transceiver. In operation, the processor may be configured to perform certain operations. For instance, the processor may detect a primary channel busy for an operating bandwidth having a plurality of channel segments comprising the primary channel and at least one non-primary channel. In response to the detecting, the processor may obtain a TXOP through a first non-primary channel of the at least one non-primary channel. Additionally, the processor may perform a transmission at least on the first non-primary channel during the TXOP.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 27 is a block diagram of an example communication system in accordance with an implementation of the present disclosure.

FIG. 28 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to transmission with partial bandwidth spectrum reuse in wireless communications. According to the present disclosure, a number of possible solutions may be implemented separately or jointly. That is, although these possible solutions may be described below separately, two or more of these possible solutions may be implemented in one combination or another.

In the present disclosure, a basic service set (BSS) is assumed to be set up with a 320-MHz or 160-MHz operating bandwidth, with an access point (AP) of the BSS operating in the 320-MHz bandwidth and non-AP devices belonging to the BSS supporting an operating bandwidth of 320 MHz, 160+160 MHz, 240 MHz, 160+80 MHz, 160 MHz, 80+80 MHz or 80 MHz. It is also assumed that an OBSS operates with an 80-MHz, 160-MHz, or 320-MHz bandwidth, with the BSS and the OBSS having the same or different primary 20-MHz channel for channel contention. Moreover, in the present disclosure, the term "primary channel" refers to a 20-MHz channel where medium access through channel contention is allowed, and the term "non-primary channel" refers to a 20-MHz channel which is not a primary channel in the wideband operating channel. Additionally, the term "channel segment" refers to a group of 20-MHz channels (e.g., in a 40-MHz, 80-MHz, 160-MHz or 240-MHz bandwidth), and the term "primary channel segment" refers to a group of 20-MHz channels including the primary (20-MHz) channel. It is noteworthy that an access point (AP) or AP station (STA) is interchangeably referred to as an "AP" while a "non-AP STA" is interchangeably referred to as an "STA" herein. The term "STA" is a general name used to refer to either a "non-AP STA" or an "AP STA" herein.

Figure 1:
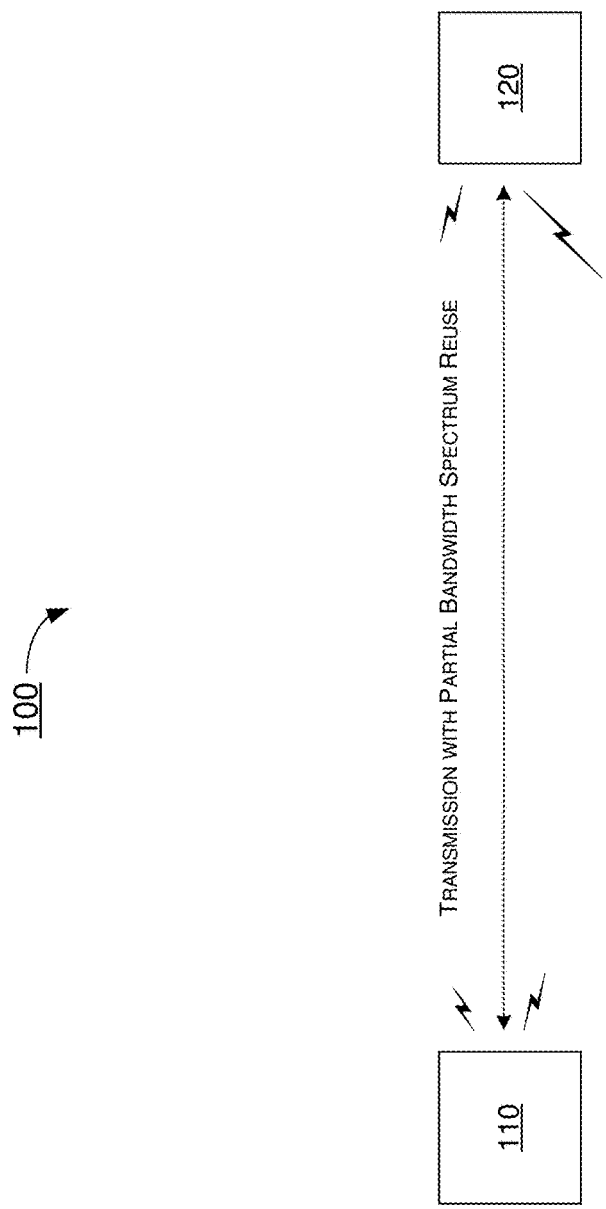
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 26 illustrate examples of implementation of various proposed schemes in network environment 100 in accordance with the present disclosure. The following description of various proposed schemes is provided with reference to FIG. 1~FIG. 26.

Referring to FIG. 1, network environment 100 may involve at least a STA 110 and another STA 120 communicating wirelessly in accordance with one or more IEEE 802.11 standards (e.g., IEEE 802.11be). STA 110 may function as an AP or, alternatively, as a non-AP STA. Similarly, STA 120 may function as an AP or, alternatively, as a non-AP STA. Each of STA 110 and STA 120 may be associated with or otherwise belong to a BSS 130 with a wide operating bandwidth (e.g., 320 MHz or another bandwidth greater than 80 MHz). Under various proposed schemes in accordance with the present disclosure, STA 110 and STA 120 may be configured to perform transmission with partial bandwidth spectrum reuse in wireless communications in accordance with various proposed schemes described below.

In network environment 100, one of STA 110 and STA 120 functioning as an AP may obtain a partial bandwidth spectrum reuse transmission opportunity (PBSR TXOP) on a partial bandwidth of an operating bandwidth when it detects a frame transmission from an OBSS or other system (not shown) with signal strength equal to or greater than a specific level. The PBSR TXOP may not include a primary channel or primary channel segment, and preamble puncturing may be applied in the PBSR TXOP on the channel(s) which is/are idle within the operating bandwidth. One or more non-primary channels or channel segments within the operating bandwidth may be assigned to non-AP device(s) associated with BSS 130 to park on and monitor new transmissions thereon. A non-AP device parking on the specific non-primary channel(s) or channel segment(s) may receive downlink (DL) transmission or be triggered for uplink (UL) transmission only. Moreover, a non-AP device may switch to the primary channel or primary channel segment to content for the medium.

With respect to a partial bandwidth transmission (PBT) procedure, when an AP device (e.g., STA 110 or STA 120) detects a frame transmission from an OBSS or a transmission from other system with signal strength equal to or greater than a specific level (e.g., −82 dBm for preamble detection (PD) threshold, −72 dBm for spatial reuse PD threshold, −62 dBm for energy detection (ED) threshold), the AP may initiate a PBSR TXOP without including the primary channel and one or more non-primary channels where the OBSS frame transmission or channel busy status is detected. The AP may operate with a bandwidth containing a group of channels. The AP may invoke a channel contention backoff procedure on the primary channel to access the wireless medium of the primary channel and, once the backoff procedure has started, the AP may suspend the ongoing backoff procedure when it detects a frame transmission or channel busy. In case the AP detects an OBSS frame with a signal strength equal to or greater than the specific level, the AP may initiate a PBSR TXOP on one or more non-primary channels which are idle. A duration of a PBSR period may be set according to TXOP duration information or PPDU length information in the received OBSS frame.

Before initiating a PBSR TXOP, the AP may invoke a PBT backoff procedure or may resume a suspended backoff procedure during the PBSR period. A backoff counter (or timer) may count down every slot time without checking the medium status. When the backoff counter counts down to zero, the AP may perform a medium status detection during a specific time interval preceding the transmission on each non-primary channel and may initiate a PBSR TXOP over the non-primary channels which are detected to be idle, with a duration of the PBSR TXOP limited by the TXOP duration or PPDU length information in the received OBSS frame. Preamble puncturing may be applied on the non-primary channels which are not idle. After the PBSR TXOP, the suspended backoff procedure may resume or a new backoff procedure may be invoked on the primary channel.

With respect to PBSR channel segments, an AP device (e.g., STA 110 or STA 120) may indicate one or more channel segments for PBSR operation. For instance, in a 320-MHz operating bandwidth with four 80-MHz channel segments, each 80-MHz channel segment may contain one or more channels, with the primary channel segment containing a primary 20-MHz channel. The AP device may assign one channel segment for a non-AP device to park on and monitor transmissions. The non-AP device may negotiate with the AP device for the channel segment to park on and monitor transmissions. Moreover, the non-AP device may switch between the primary channel segment and a non-primary channel segment. For instance, when parking on the non-primary channel segment, the non-AP device may switch to the primary channel segment. The non-AP device may do so: (1) based on an indication from the AP device, (2) by indicating to the AP device to disable a trigger-based UL transmission, and/or (3) by an indication of channel segment switching announcement. Moreover, when parking on the primary channel segment, the non-AP device may indicate that it is switching to a non-primary channel segment. The non-AP device may do so by signaling to enable the AP device to trigger an UL transmission and/or requesting for channel segment switching by signaling a specific channel segment (e.g., channel segment switching announcement).

With respect to non-AP device operation in a PBSR TXOP, non-AP devices may park on and monitor a specific channel segment for PBSR operation. For instance, a DL frame transmission may be within a specific channel segment assigned to the non-AP device(s). A control (trigger) frame may include individually addressed resource allocation information to trigger an UL transmission addressed to non-AP device(s). A non-AP device may monitor the specific channel segment which is assigned to it and may update its network allocation vector (NAV) in case it receives a frame on that channel. When responding to a trigger frame, the non-AP device may perform clear channel assessment (CCA) to sense a state of the medium on the channel(s) where the resource is allocated and/or check the NAV value to determine whether or not to transmit on the medium. The non-AP device may access the medium on the primary channel using a channel contention mechanism, and the non-AP device may be triggered by an AP device for UL transmission(s) when the non-AP device is parking on the non-primary channel segment. When the non-AP device decides to contend for the medium, it may switch back to the primary channel/primary channel segment first. After switching to the primary channel/primary channel segment, the non-AP device may perform clear channel access (CCA) until it detects a frame by which the non-AP device may set its NAV or until a period of time has transpired. In the various examples shown and described in FIG. 2~FIG. 5, EDCA-based channel contention may be allowed for an AP device on non-primary channels when the primary channel is not available.

Figure 2:
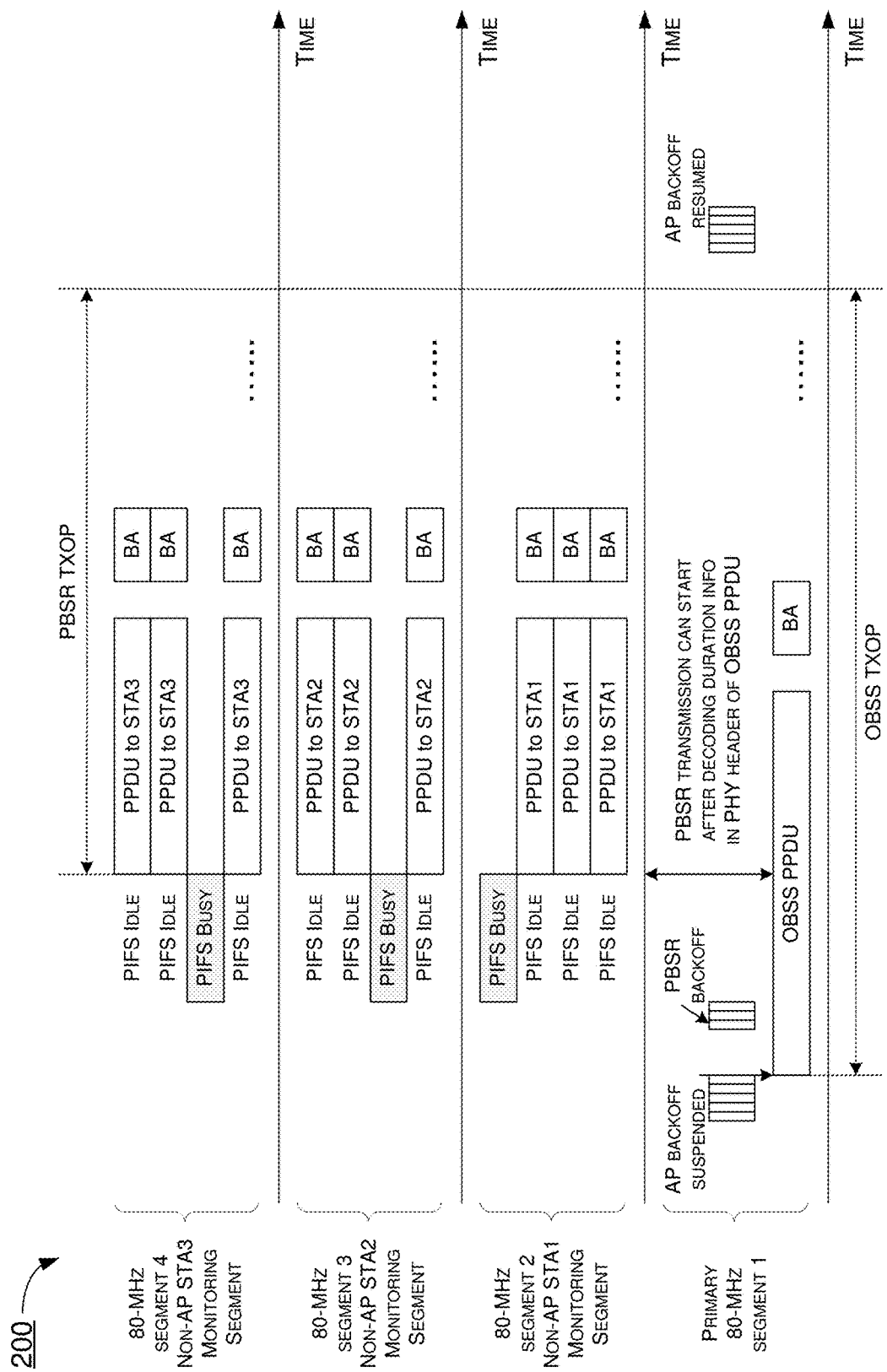
FIG. 2 is a diagram of an example scenario in accordance with the present disclosure.

FIG. 2 illustrates an example scenario 200 in accordance with the present disclosure. In scenario 200, an AP device (e.g., STA 110 or STA 120) operates with a 320-MHz operating bandwidth and divides the 320-MHz bandwidth into four 80-MHz channel segments. One of the four 80-MHz channel segments is a primary 80-MHz channel segment 1 and the other three 80-MHz channel segments are assigned to different non-AP devices (e.g., STA1, STA2 and STA3) to park on and monitor transmissions thereon. Each of the 80-MHz channel segments contains four 20-MHz channels with one of which being a primary 20-MHz channel. When the AP device detects a frame (e.g., a Physical Layer Convergence Procedure (PLCP) protocol data unit (PPDU)) on the primary 20-MHz channel of the primary 80-MHz channel segment 1, the AP device may suspend its ongoing backoff counter and obtain duration information of the OBSS transmission in the physical layer (PHY) header of the received PPDU. After determining that the received frame is from an OBSS with a signal strength equal to or greater than a specific level (e.g., −62 dBm), the AP device may initiate a PBSR TXOP without including the primary 80-MHz channel segment 1, with the time duration of a PBSR period being limited by the duration information in the received OBSS PPDU. Before initiating the PBSR TXOP, the AP device may invoke a PBT backoff procedure for a PBT backoff counter to count down every time slot without checking the status of the medium. The PBT backoff counter may be initialized with a random number selected from a uniform distribution in a range of 0 M, with M being a positive integer (e.g., 10).

When the PBT backoff counter counts down to zero, the AP device may perform a medium status detection during a specific time interval (e.g., a point coordination function (PCF) inter-frame space (PIFS) interval) preceding the transmission on each channel within the 320-MHz operating bandwidth except the channels in the primary 80-MHz channel segment 1. The AP device may initiate a PBSR TXOP over the channels which are idle during the PIFS interval after the PBT backoff counter counts down to zero. Preamble puncturing may be applied on the channels which are not idle. The PBSR TXOP may be limited by the duration information of the OBSS transmission in the received OBSS PPDU. Non-AP STA1, STA2 and STA3 may monitor the 80-MHz channel segments 2, 3 and 4, respectively, and may receive PPDUs transmitted on those channel segments. Each of STA1, STA2 and STA3 may respond with a block acknowledgement (BA) in response to receiving the respective PPDU. After the end of the PBSR TXOP, the suspended backoff procedure may be resumed on the primary channel.

Figure 3:
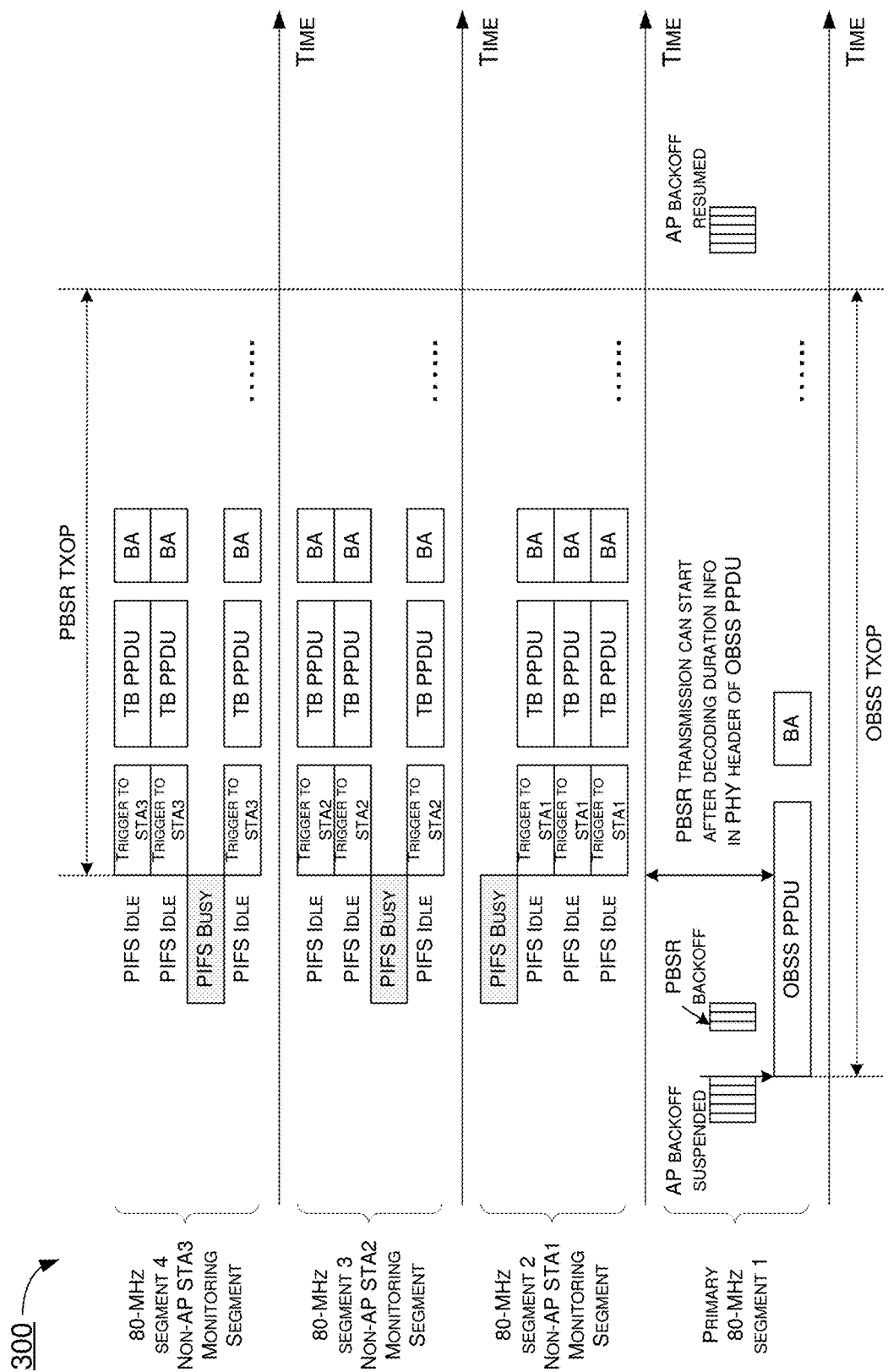
FIG. 3 is a diagram of an example scenario in accordance with the present disclosure.

FIG. 3 illustrates an example scenario 300 in accordance with the present disclosure. In scenario 300, an AP device (e.g., STA 110 or STA 120) may initiate a PBSR TXOP to trigger UL transmissions from non-AP devices. The non-AP STA1, STA2 and STA3 may monitor the 80-MHz channel segments 2, 3 and 4, respectively, and may respond to the trigger frame in case the channels where the allocated resources are idle. For instance, in case the bandwidth of STAs is less than or equal to 80 MHz, the resource allocation for non-AP STA1, STA2 and STA3 may be within the monitoring 80-MHz channel segments 2, 3 and 4, respectively. In case the bandwidth of STAs is greater than 80 MHz, the resource allocation for non-AP STA1, STA2 and STA3 may not be limited within the respective monitoring channel segment. In the example shown in FIG. 3, each of non-AP STA1, STA2 and STA3 may receive a respective trigger and, correspondingly, each of STA1, STA2 and STA3 may transmit a trigger-based (TB) PPDU and receive a BA from the AP device.

Figure 4:
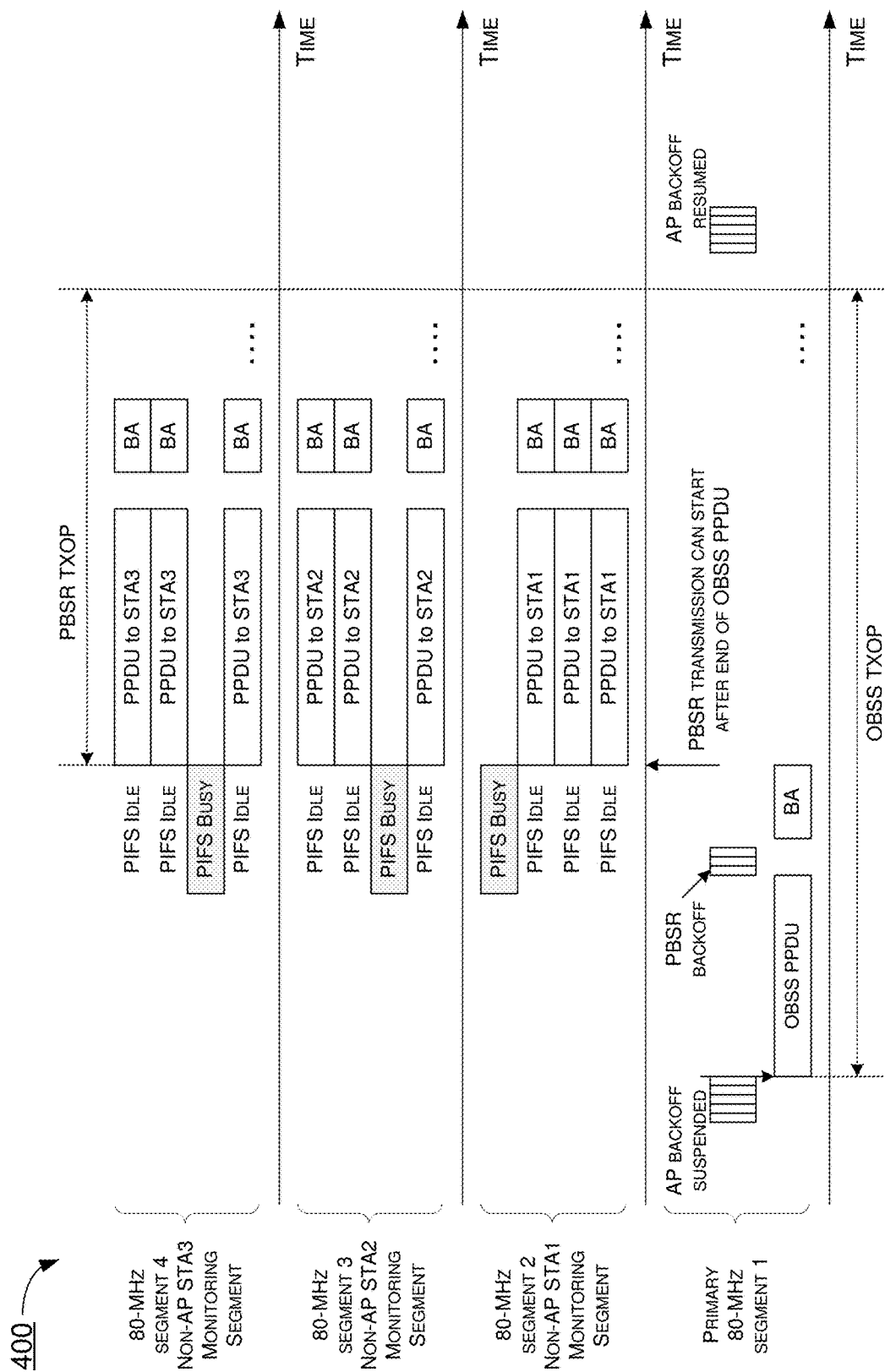
FIG. 4 is a diagram of an example scenario in accordance with the present disclosure.

FIG. 4 illustrates an example scenario 400 in accordance with the present disclosure. In scenario 400, an AP device (e.g., STA 110 or STA 120) may initiate a PBSR TXOP after end of the received OBSS PPDU. The AP device may obtain the duration information (e.g., TXOP duration of the OBSS TXOP) in the medium access control layer (MAC) header of the OBSS PPDU, and the AP device may invoke a PBT backoff procedure after end of the OBSS PPDU. When the PBT backoff counter counts down to zero, the AP device may perform a medium status detection during a specific time interval (e.g., PIFS interval) preceding the transmission on each channel within the 320-MHz operating bandwidth except the channels in the primary 80-MHz channel segment 1. The PBSR TXOP may be limited by the TXOP duration of the OBSS TXOP. In the example shown in FIG. 4, after the end of the OBSS PPDU, the AP device may transmit PPDUs on idle channels in channel segments monitored by STA1, STA2 and STA3. Each of STA1, STA2 and STA3 may respond with a BA in response to receiving the respective PPDU.

Figure 5:
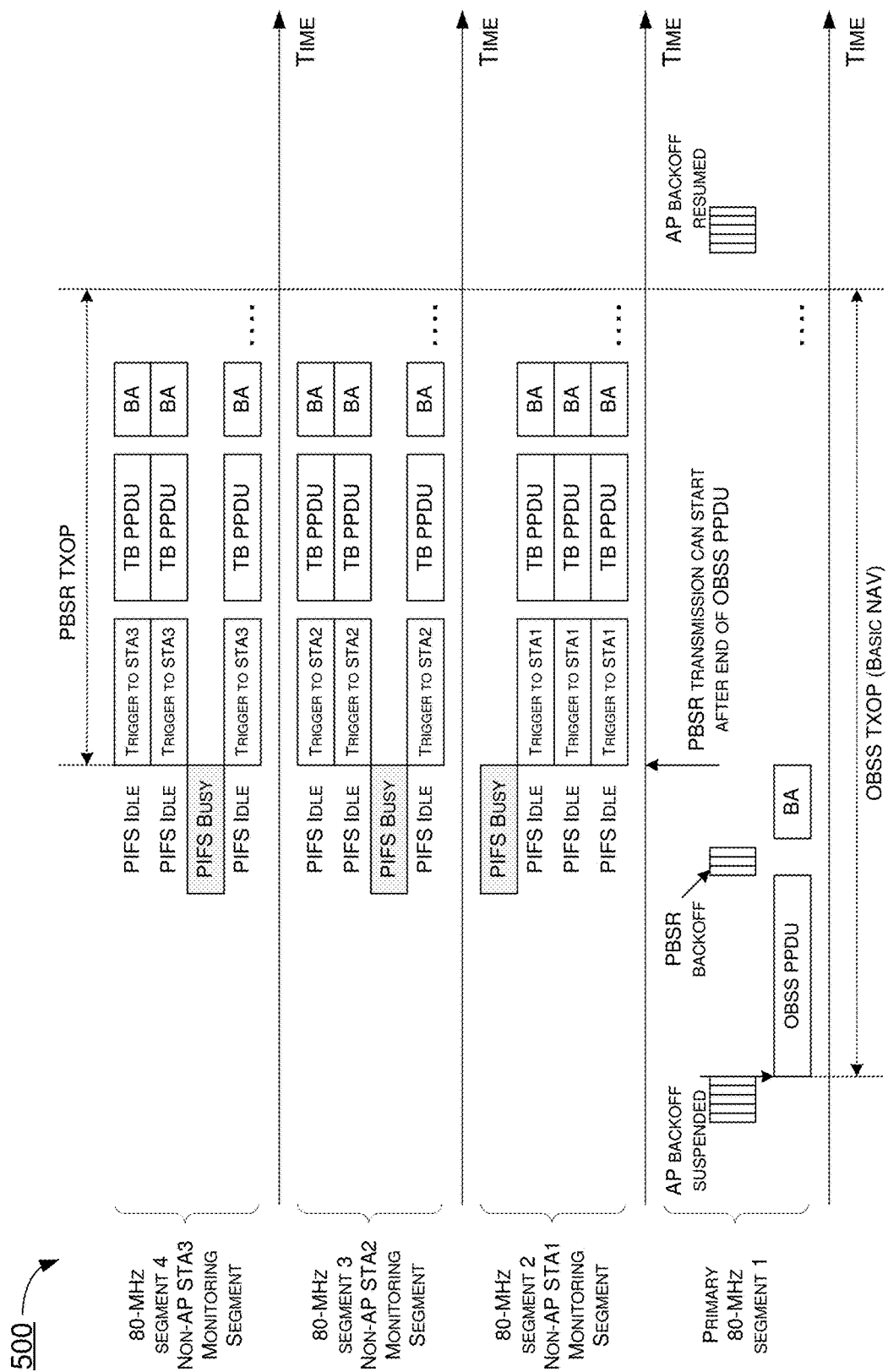
FIG. 5 is a diagram of an example scenario in accordance with the present disclosure.

FIG. 5 illustrates an example scenario 500 in accordance with the present disclosure. In scenario 500, an AP device (e.g., STA 110 or STA 120) may initiate a PBSR TXOP to trigger UL transmissions from non-AP devices after end of the received OBSS PPDU. The AP device may obtain the TXOP duration of the OBSS TXOP in the MAC header of the received OBSS PPDU, and the AP device may invoke a PBT backoff procedure after end of the received OBSS PPDU. Non-AP STA1, STA2 and STA3 may monitor the 80-MHz channel segments 2, 3 and 4, respectively, and may respond to the trigger frame in case the channels where the allocated resources are idle. For instance, in case the bandwidth of STAs is less than or equal to 80 MHz, the resource allocation for non-AP STA1, STA2 and STA3 may be within the monitoring 80-MHz channel segments 2, 3 and 4, respectively. In case the bandwidth of STAs is greater than 80 MHz, the resource allocation for non-AP STA1, STA2 and STA3 may not be limited within the respective monitoring channel segment. In the example shown in FIG. 5, each of non-AP STA1, STA2 and STA3 may receive a respective trigger and, correspondingly, each of STA1, STA2 and STA3 may transmit a trigger-based PPDU and receive a BA from the AP device.

Under a proposed scheme in accordance with the present disclosure, to support PBSR based on EDCA, a device may maintain two backoff function states, with a first backoff function state used on the primary channel and a second backoff function state used on one or more selected non-primary channels. Under the proposed scheme, a device performing EDCA on the primary channel may suspend an operation of its EDCA function (EDCAF) when the primary channel is busy, and the device may store a value of each of the backoff parameters (e.g., backoff counter, contention window (CW[AC]), quality of service (QoS) station (STA) retry counter (QSRC[AC]), and so on) as the first backoff function state. To obtain a PBSR TXOP on a non-primary channel, the EDCAF of the device may invoke a new PBT backoff procedure or resume the first backoff procedure as the PBT backoff for accessing the wireless medium on the selected non-primary channel(s). In case the device has a pending MAC protocol data unit (MPDU) for an intended recipient on the selected non-primary channel(s), the EDCAF of the device may invoke a new PBT backoff procedure corresponding to the access category (AC) of the pending MPDU on the selected non-primary channel(s).

Under the proposed scheme, the PBT backoff procedure may follow EDCA parameters and rules specific to PBSR TXOP. For instance, the EDCA parameters for PBSR TXOP may have a smaller (truncated) contention window. In case the PBT backoff is a new backoff procedure, the CW may be truncated by a portion of the regular CW[AC] (e.g., one half of a regular CW[AC] and rounded up to the nearest integer). In case the PBT backoff is the continuation of the resumed first backoff procedure, the value of the PBT backoff counter may be copied from the value of the first backoff procedure or be truncated by a portion of the value of the first backoff counter (e.g., one half of the value and rounded up to the nearest integer). The EDCA backoff CCA-ED threshold may be adjusted within a certain range (e.g., −82 dBm to −62 dBm), for example, by a delta dB lower than the regular CCA-ED threshold. The TXOP limit for PBSR TXOP may be dynamically limited by the channel busy status on the primary channel (e.g., non-zero NAV, non-zero PPDU length, non-zero channel occupancy time (COT), or a specific value for PBT).

Under a proposed scheme in accordance with the present disclosure, a PBT backoff procedure may be invoked in parallel on multiple selected non-primary channels. In case multiple PBT backoff counters are initiated as new PBT backoff procedures in parallel, each PBT backoff counter may be initialized with a respective (different) random number based on the corresponding CW[AC] of the pending MPDU targeting at the recipients on the selected non-primary channel. Alternatively, each PBT backoff counter may be initialized with the same random number within a specific CW[AC] for PBSR or which may be decided by all the corresponding CW[AC] of the pending MPDU targeting at the recipients on all the selected non-primary channels (e.g., Min(CW[AC]), Max(CW[AC]), Average(CW[AC])). In case multiple PBT backoff counters are resumed from the first backoff procedure as PBT backoff procedures in parallel, each PBT backoff counter may be initialized with a respective (different) random number based on the first backoff function state of the pending MPDU targeting at the recipients on the selected non-primary channel. Alternatively, each PBT backoff counter may be initialized with the same random number within a specific CW[AC] for PBSR or which may be decided by the first backoff function state of the pending MPDU targeting at the recipients on all the selected non-primary channels (e.g., Min(CW[AC]), Max (CW[AC]), Average(CW[AC])). Under the proposed scheme, once a PBT backoff counter reaches zero, a PBT may be performed on the non-primary channel which wins the medium. The other non-primary channels within one 80-MHz channel segment or multiple 80-MHz channel segments may be used in case of detection of PIFS idle before the start of the transmission.

Under a proposed scheme in accordance with the present disclosure, a PBT backoff procedure may be invoked sequentially on multiple selected non-primary channels within the PBSR TXOP. In case multiple PBT backoff counters are initiated as new PBT backoff procedures sequentially, each PBT backoff counter or timer may be initialized with a different random number based on the corresponding CW[AC] of the pending MPDU targeting at the recipients on the selected non-primary channel. Alternatively, each PBT backoff counter may be initialized with the same random number within a specific CW[AC] for PBSR. In case multiple PBT backoff counters are resumed from the first backoff procedure as PBT backoff procedures sequentially, each PBT backoff counter may be initialized with a different random number based on the first backoff function state of the pending MPDU targeting at the recipients on the selected non-primary channel. Alternatively, each PBT backoff counter may be initialized with the same random number within a specific CW[AC] for PBSR. Under the proposed scheme, in case a PBT backoff counter is suspended due to channel busy on the selected non-primary channel, another PBT backoff on another selected non-primary channel may be initiated. The other non-primary channels within one 80-MHz channel segment or multiple 80-MHz channel segments may be used in case of detection of PIFS idle before the start of the transmission.

Under a proposed scheme in accordance with the present disclosure, a PBSR TXOP may be performed sequentially on multiple selected non-primary channels within a PBSR period. Once a PBSR TXOP is finished on the selected non-primary channel, one or more other PBT backoff procedures may be invoked to obtain another PBSR TXOP sequentially. The corresponding PBT backoff counter may be initialized with a different random number based on the corresponding CW[AC] of the pending MPDU targeting at the recipients on the selected non-primary channel or with the same random number within a specific CW[AC] for PBSR. The corresponding PBT backoff counter may be initialized with a different random number based on the first backoff function state of the pending MPDU targeting at the recipients on the selected non-primary channel. Alternatively, each PBT backoff counter may be initialized with the same random number within a specific CW[AC] for PBSR.

Figure 6:
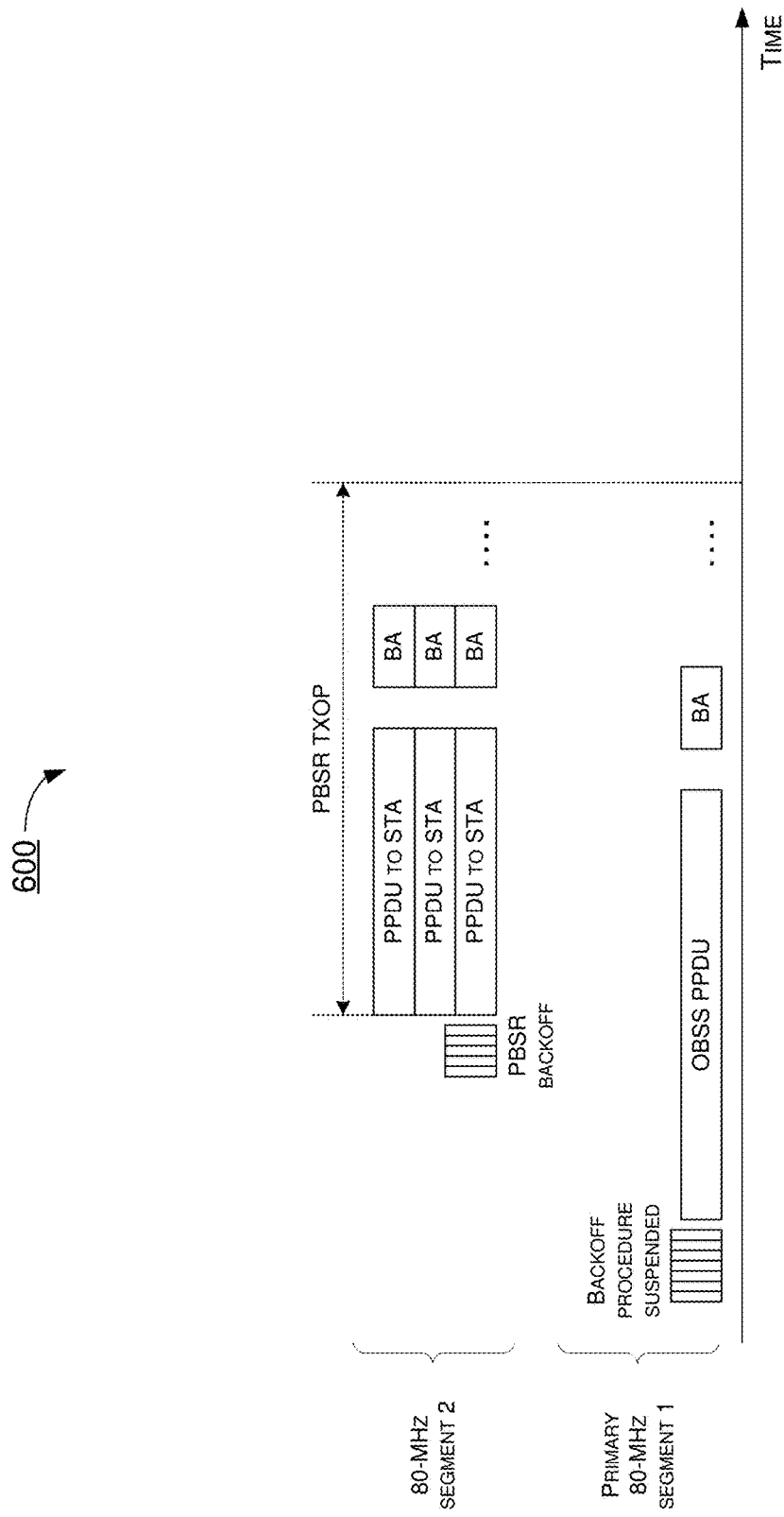
FIG. 6 is a diagram of an example scenario in accordance with the present disclosure.

FIG. 6 illustrates an example scenario 600 in accordance with the present disclosure. In scenario 600, before the start of a PBSR TXOP, a new PBSR EDCA backoff procedure may be initiated on a non-primary channel when there is a pending packet/frame for an intended recipient on the non-primary channel. For instance, the EDCA backoff procedure on the primary channel may be suspended due to the medium status being channel busy.

Figure 7:
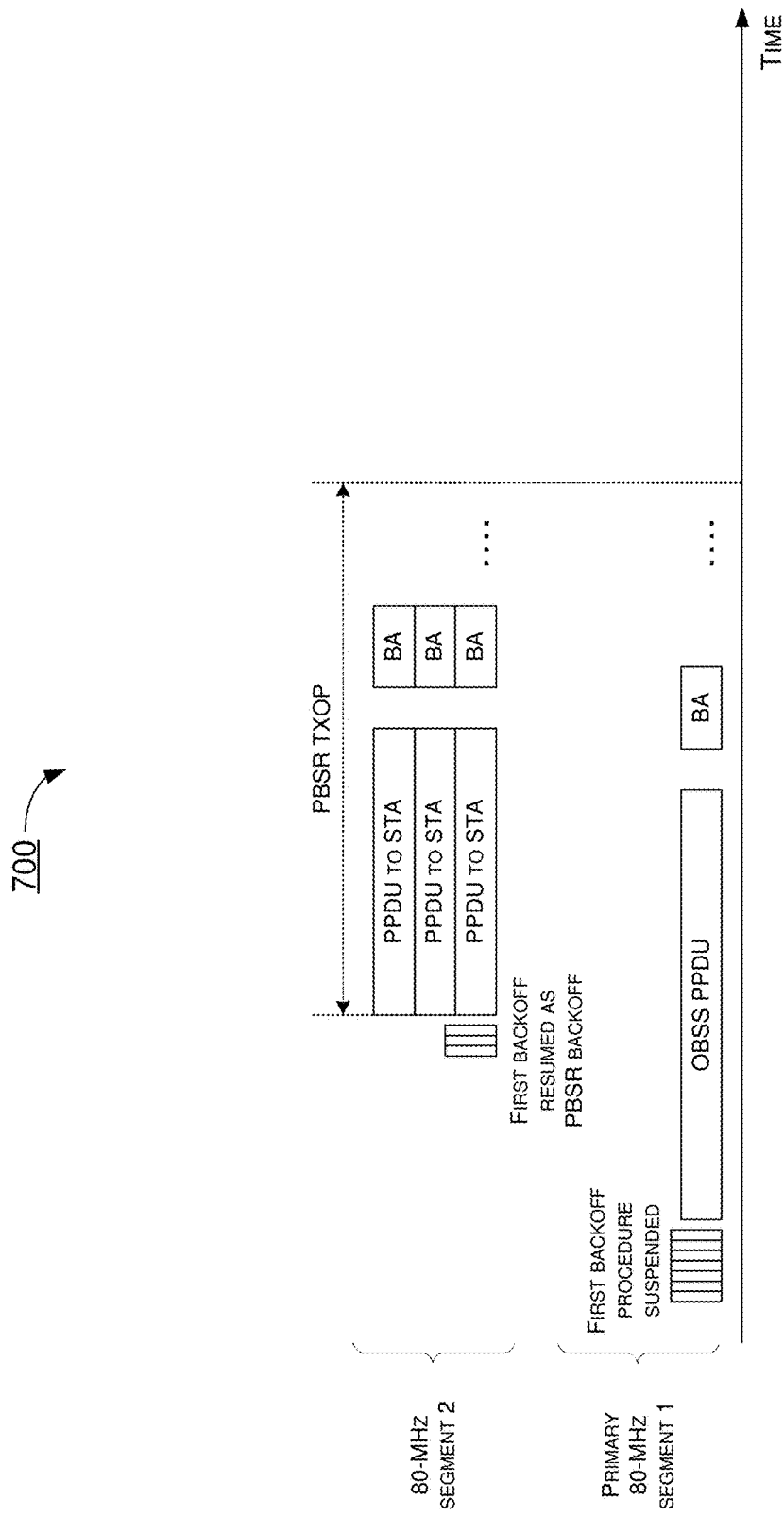
FIG. 7 is a diagram of an example scenario in accordance with the present disclosure.

FIG. 7 illustrates an example scenario 700 in accordance with the present disclosure. In scenario 700, before the start of a PBSR TXOP, a suspended first EDCA backoff procedure may be resumed on a non-primary channel. For instance, in case the first backoff procedure corresponds to an access category (AC) of the pending packet/frame for an intended recipient on the non-primary channel, the suspended EDCA backoff procedure may be resumed on the non-primary channel.

Figure 8:
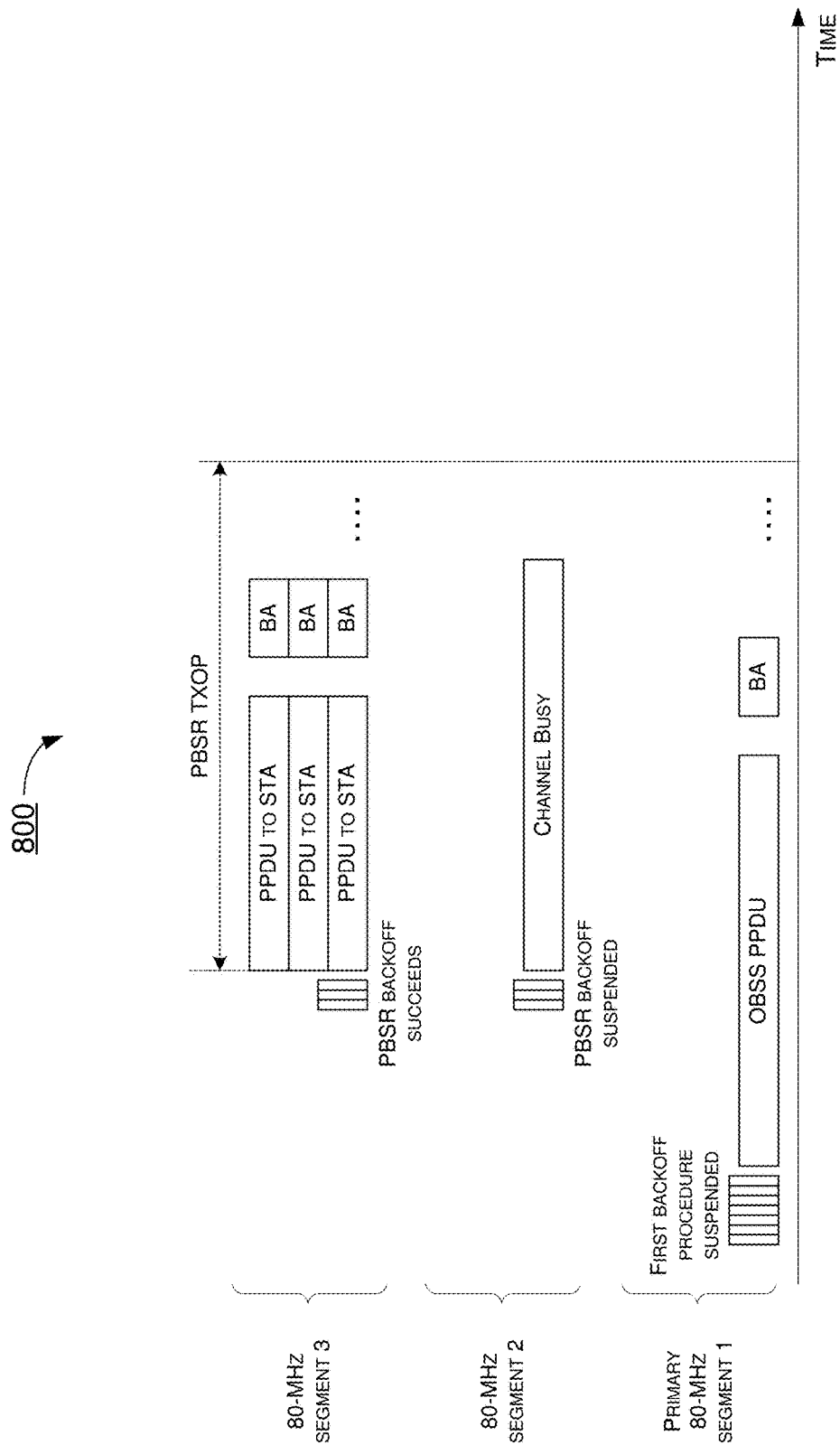
FIG. 8 is a diagram of an example scenario in accordance with the present disclosure.

FIG. 8 illustrates an example scenario 800 in accordance with the present disclosure. In scenario 800, before the start of a PBSR TXOP, one or more PBT backoff procedures may be invoked on one or more non-primary channels. For instance, one or more PBT backoff procedures may be invoked in parallel or sequentially and, as any PBT backoff counter reaches zero first, the PBSR TXOP may be obtained on the non-primary channel which wins the medium. Moreover, only one PBSR TXOP may be initiated after the successful PBT backoff.

Figure 9:
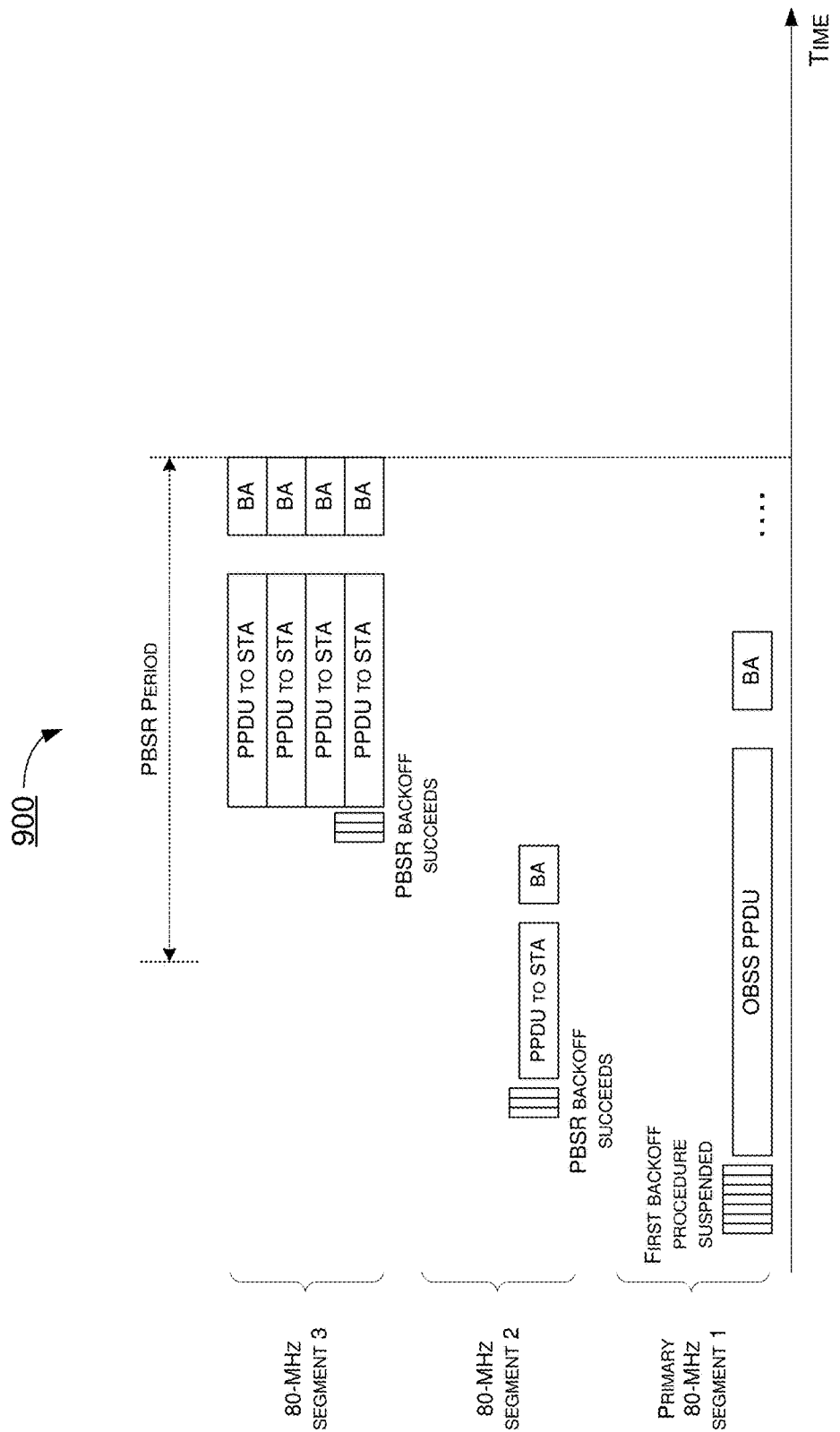
FIG. 9 is a diagram of an example scenario in accordance with the present disclosure.

FIG. 9 illustrates an example scenario 900 in accordance with the present disclosure. In scenario 900, one or more PBT backoff procedures and PBTs may be invoked on one or more non-primary channels within a PBSR period. For instance, one or more PBT backoff procedures and TXOPs may be initiated sequentially as shown in FIG. 9. One or more PBSR TXOPs may also be initiated in parallel within the PBSR period in case the device supports multiple parallel PBT backoff procedures and support multiple synchronous or asynchronous TXOPs on different segments in the wide operating bandwidths.

Figure 10:
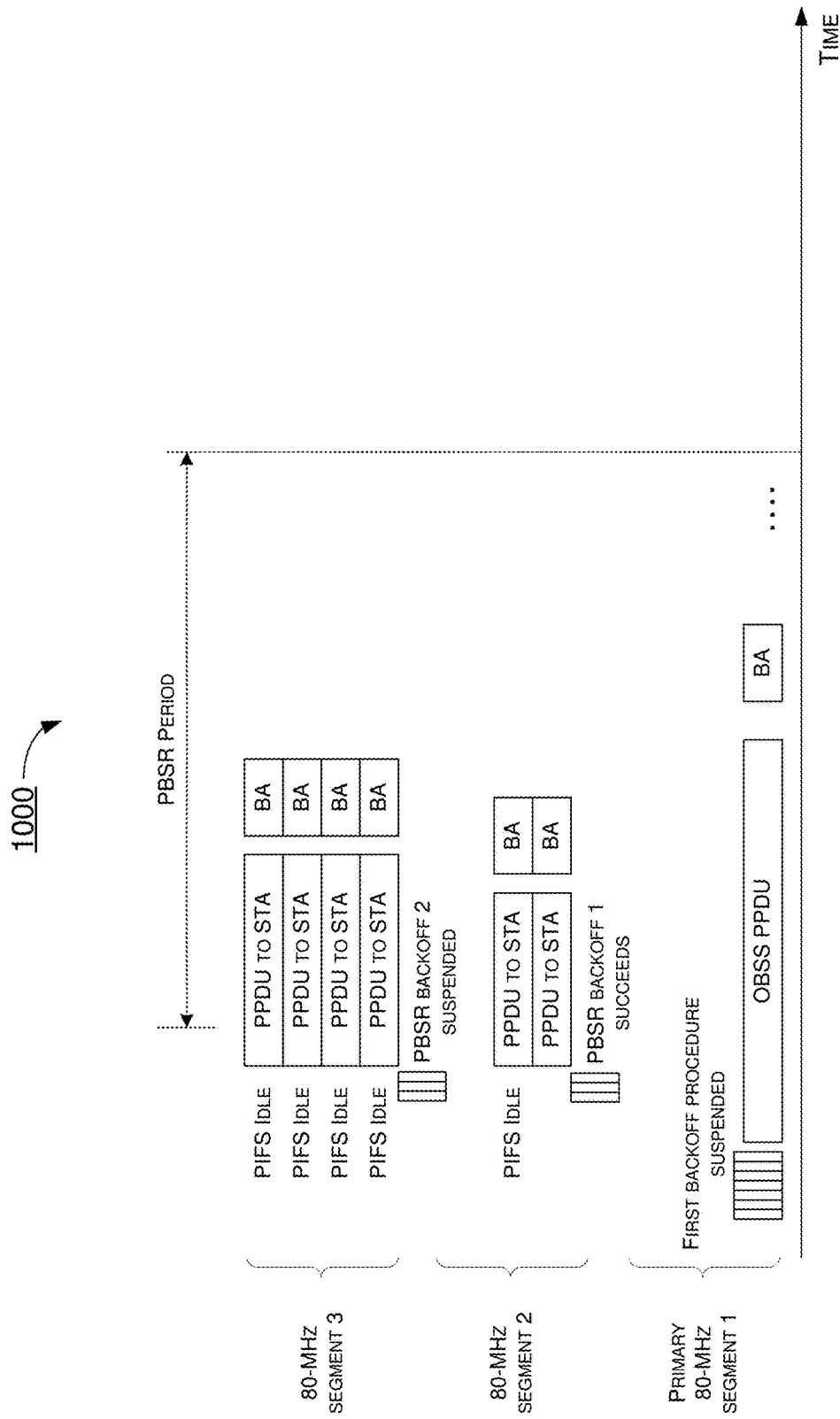
FIG. 10 is a diagram of an example scenario in accordance with the present disclosure.

FIG. 10 illustrates an example scenario 1000 in accordance with the present disclosure. In scenario 1000, one or more PBT backoff procedures may be invoked on one or more non-primary channels within a PBSR period, and one PBT may be performed once a PBT backoff counter reaches zero. For instance, one or more PBT backoff procedures may be initiated in parallel as shown in FIG. 10. Once a PBT backoff succeeds, the other ongoing PBT backoff may be suspended. The PBSR TXOP may occupy the idle non-primary channels based on the PIFS idle detection including the channel where the PBT backoff was suspended.

Under a proposed scheme in accordance with the present disclosure, at the end of a PBSR TXOP on the non-primary channel(s), the EDCAF of the device may resume the restored first backoff procedure or invoke a new backoff procedure on the primary channel. For instance, in case the previously stored first backoff function state is empty, or in case the first backoff function state has zero value of backoff counter, then the EDCAF of the device may invoke a new backoff procedure on the primary channel. Otherwise, the EDCAF of the device may resume the first backoff procedure. Under the proposed scheme, at the end of the PBSR TXOP on the non-primary channel(s), in case the medium on the primary channel is idle (e.g., both the virtual carrier sense (CS), such as NAV, PPDU length and/or COT value, and physical CS mechanism such as CCA-ED) indicating the medium being idle), the first backoff procedure may resume to decrement the backoff counter or a new backoff procedure may be initialized to decrement the backoff counter. Moreover, at the end of the PBSR TXOP on the non-primary channel(s), in case the medium on the primary channel is busy (e.g., any of NAV, PPDU length and COT value is non-zero or CCA-ED is busy), the first backoff procedure may resume to decrement the backoff counter or a new backoff procedure may be initialized to decrement the backoff counter when the medium becomes idle.

Under the proposed scheme, a sync counter (e.g., synchronization timer) may be initiated to start a synchronization period right at the end of the PBSR TXOP on the non-primary channel(s). For instance, the counter may not be initiated in case the virtual CS indicates the medium on the primary channel is busy (e.g., non-zero NAV, non-zero PPDU length or non-zero COT) right after the end of the PBSR TXOP on the non-primary channel(s). Alternatively, the counter may not be initiated in case the physical CS mechanism indicates the medium is busy right after the end of the PBSR TXOP on the non-primary channel(s). Under the proposed scheme, the CCA-ED threshold may be adjusted, for example, by delta dB lower than a regular CCA-ED threshold within a certain range (e.g., −82 dBm to −62 dBm), until a PPDU is received with a valid TXOP duration information (in order to set the NAV), or the sync counter expires in case the counter is initiated, whichever occurs first.

Figure 11:
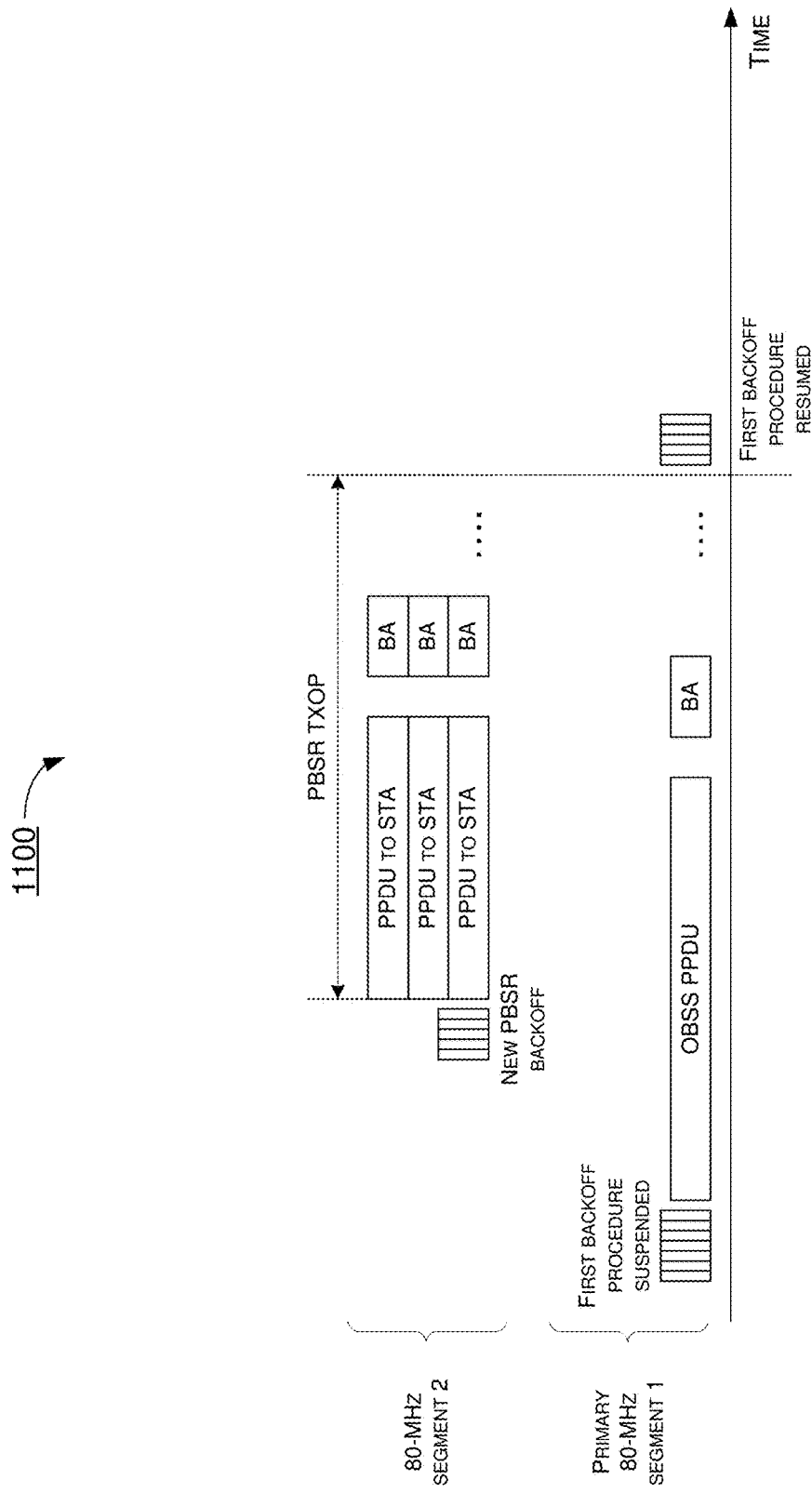
FIG. 11 is a diagram of an example scenario in accordance with the present disclosure.

FIG. 11 illustrates an example scenario 1100 in accordance with the present disclosure. In scenario 1100, after the end of a PBSR TXOP, a suspended EDCA backoff procedure on the primary channel may be resumed right after the end of the PBSR TXOP. In scenario 1100, an EDCA backoff procedure on the primary channel may be suspended due to the medium status being channel busy. Moreover, a PBSR EDCA backoff procedure on the non-primary channel(s) may be invoked.

Figure 12:
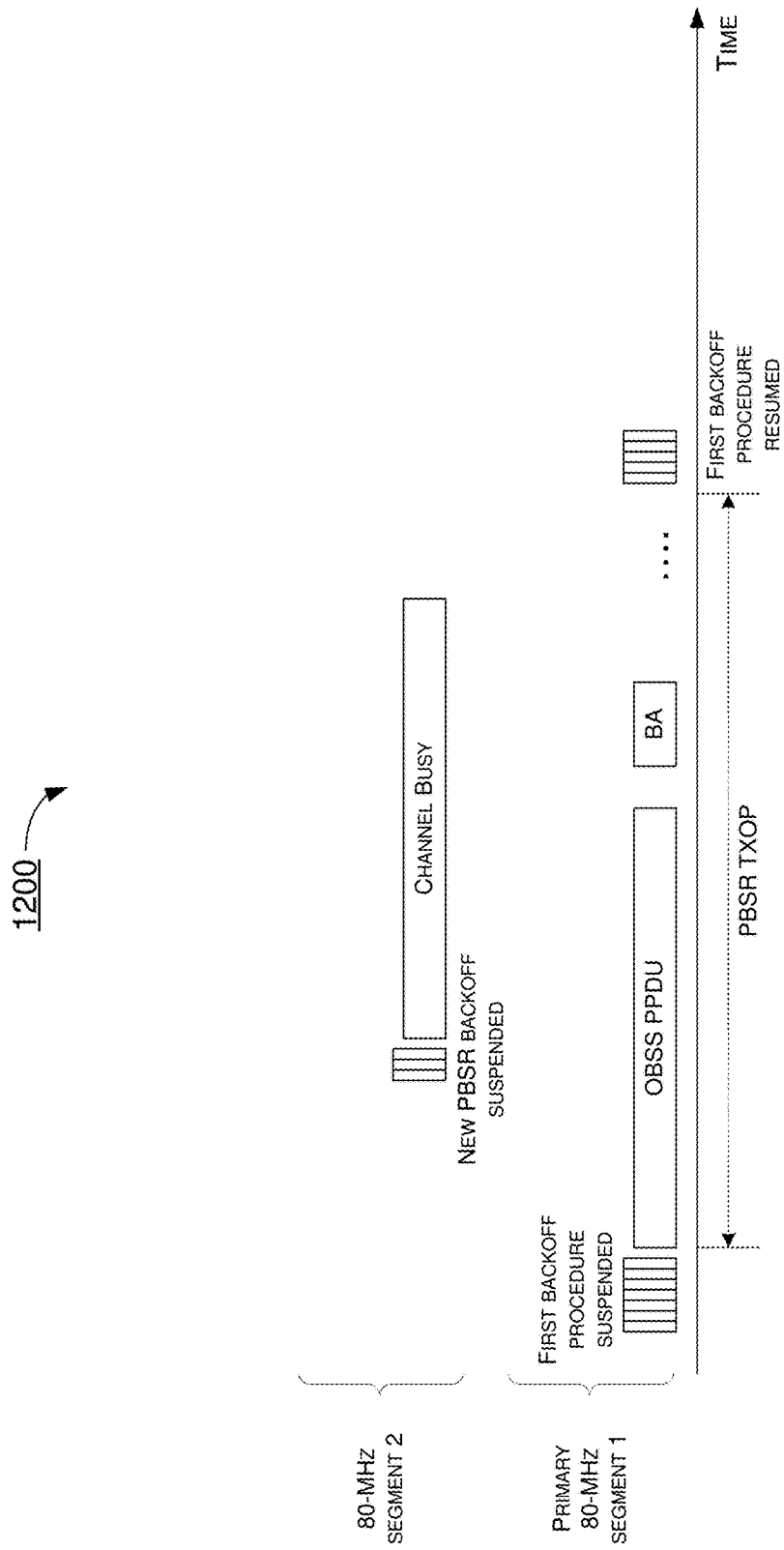
FIG. 12 is a diagram of an example scenario in accordance with the present disclosure.

FIG. 12 illustrates an example scenario 1200 in accordance with the present disclosure. In scenario 1200, in case a PBT backoff procedure is suspended due to channel being busy, a suspended EDCA backoff procedure on the primary channel may be resumed at the end of TXOP on the primary channel. In scenario 1200, an EDCA backoff procedure on the primary channel may be suspended due to the medium status being channel busy. Moreover, a PBSR EDCA backoff procedure on the non-primary channel(s) may be invoked and suspended due to channel being busy.

Figure 13:
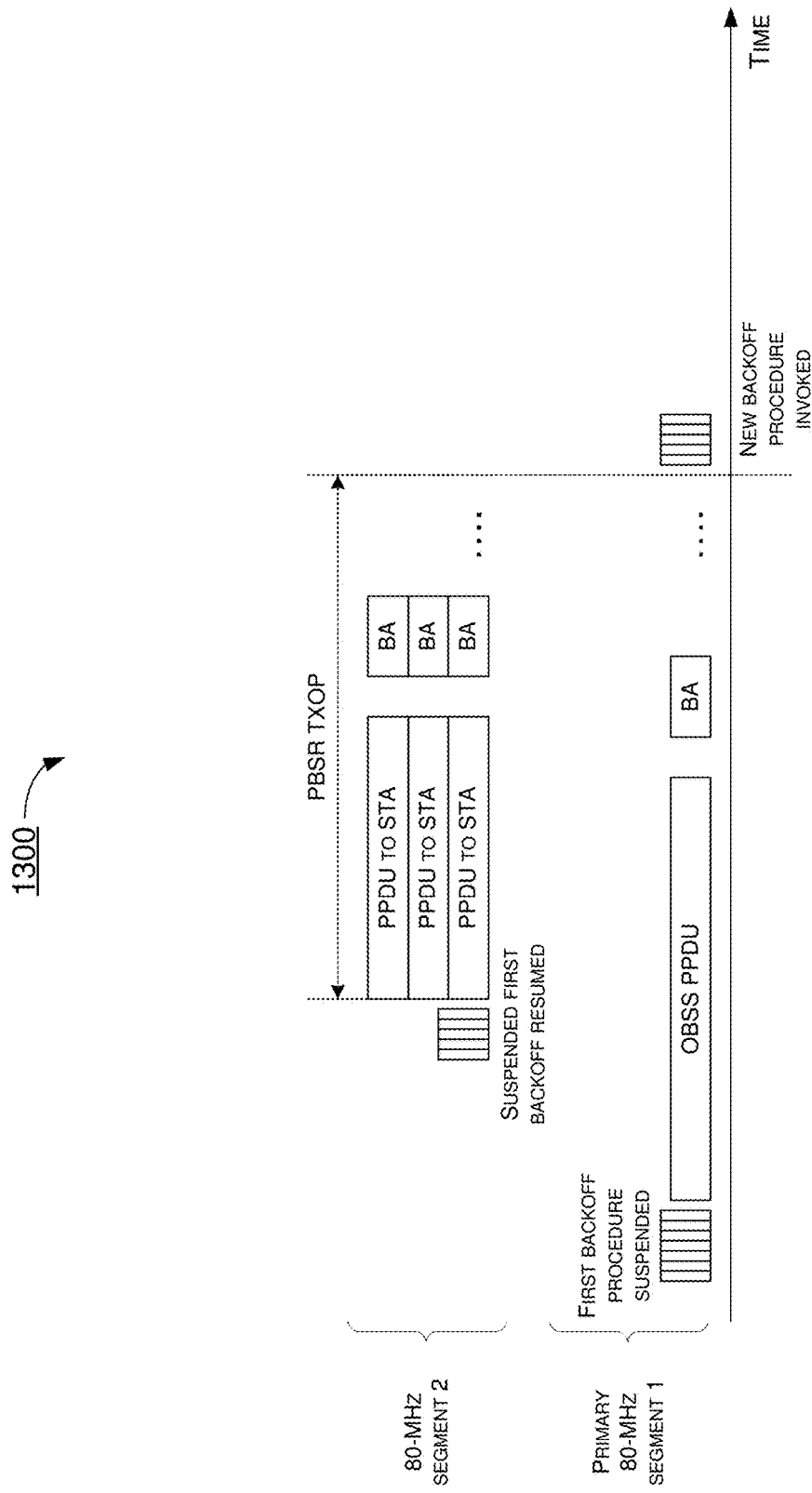
FIG. 13 is a diagram of an example scenario in accordance with the present disclosure.

FIG. 13 illustrates an example scenario 1300 in accordance with the present disclosure. In scenario 1300, after the end of a PBSR TXOP, a new EDCA backoff procedure on the primary channel may be invoked, even if no additional transmissions are currently queued, right after the end of the PBSR TXOP. In scenario 1300, an EDCA backoff procedure on the primary channel may be suspended due to the medium status being channel busy. Moreover, a suspended EDCA backoff procedure may be resumed on the non-primary channel(s) within the busy time on the primary channel.

Figure 14:
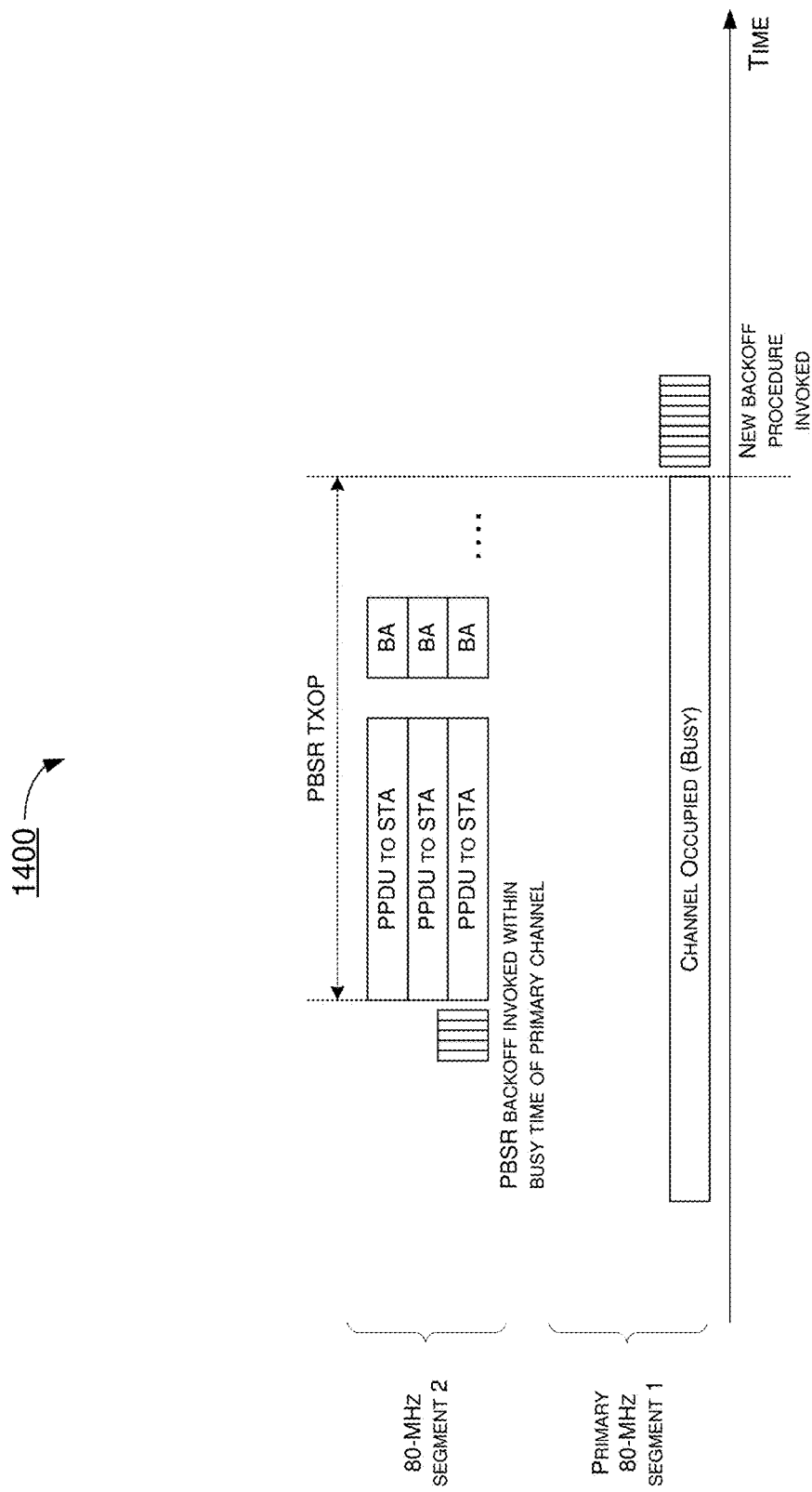
FIG. 14 is a diagram of an example scenario in accordance with the present disclosure.

FIG. 14 illustrates an example scenario 1400 in accordance with the present disclosure. In scenario 1400, after the end of a PBSR TXOP, a new EDCA backoff procedure on the primary channel may be invoked, even if no additional transmissions are currently queued. In scenario 1400, a PBSR EDCA backoff procedure on the non-primary channel(s) may be invoked when the primary channel is occupied (busy).

Under a proposed scheme in accordance with the present disclosure, at the end of the PBSR TXOP on the non-primary channel(s), a device with a second backoff counter (PBT backoff counter) may reset and disregard the second backoff function state. In case the PBT backoff procedure is a new initiated backoff procedure, the second backoff function state may be reset on the selected non-primary channel, and the previously stored first backoff function state may be restored on the primary channel. In case the PBT backoff procedure is a resumption of a first backoff procedure on the primary channel, the second backoff function state may be reset on the selected non-primary channel, and the previously stored first backoff function state may be restored on the primary channel. Alternatively, the new backoff function state may replace the first backoff function state on the primary channel.

Under a proposed scheme in accordance with the present disclosure, when a device leaves the primary channel and starts a PBSR period on a non-primary channel, the device may always start a transmission with a control frame to request acknowledgement with required channel status on the responder side in order to obtain and protect the PBSR TXOP on the non-primary channel. For instance, an exchange of request-to-send (RTS) and a clear-to-send (CTS) frames may be used for PBSR TXOP protection. The intended recipient parking on the non-primary channel or channel segment may maintain virtual channel status (NAV) for the corresponding non-primary channel. Once the intended recipient device detects the medium being idle (e.g., NAV is zero and/or CCA-ED is idle), the recipient device may respond to the received control frame. The PBSR period may be the duration when the primary channel is estimated to be busy. For instance, the PBSR period may be determined based on TXOP duration information of the ongoing transmission detected on the primary channel. Alternatively, or additionally, the PBSR period may be determined based on the PPDU length of the ongoing transmission detected on the primary channel. Alternatively, or additionally, the PBSR period may be determined based on the COT of another system. Before expiration of the PBSR period or an early termination of the PBSR period, the maximum allowed number of transmissions starting with a control frame exchange may be specified. Multiple PBTs may be allowed within the PBSR period on the same or different non-primary channels/channel segments.

Figure 15:
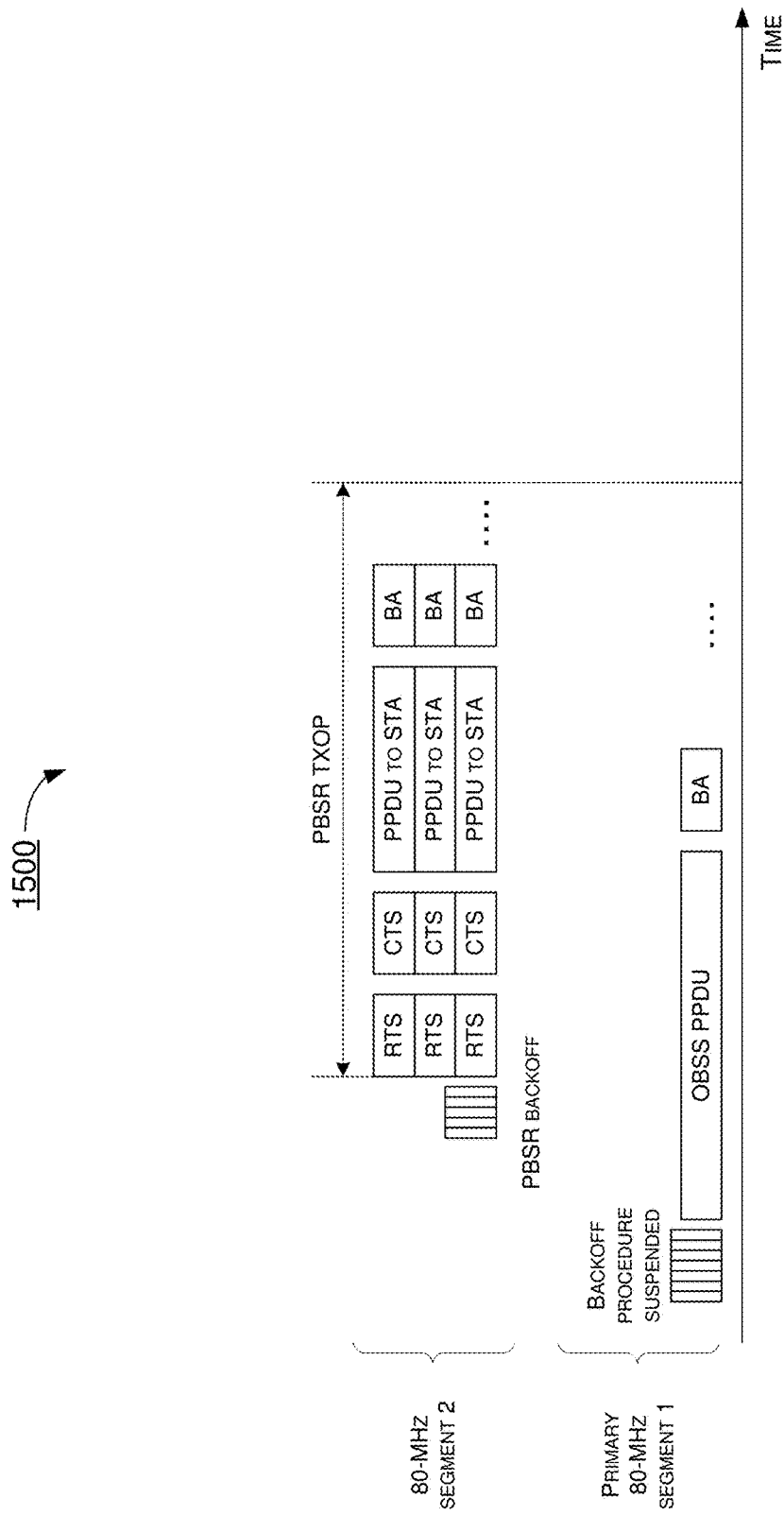
FIG. 15 is a diagram of an example scenario in accordance with the present disclosure.

FIG. 15 illustrates an example scenario 1500 in accordance with the present disclosure. In scenario 1500, when a PBT backoff counter reaches zero, a control frame exchange may be initiated to obtain a PBSR TXOP on a non-primary channel. For instance, RTS/CTS frame exchange may be mandatory for PBSR TXOP. Also, multi-user (MU)-RTS/CTS frame exchange may be mandatory for multi-user TXOP protection.

Under a proposed scheme in accordance with the present disclosure, when a PBSR period on a non-primary channel expires or a device determines to early-terminate the PBSR period, the device may resume or invoke a backoff procedure on the primary channel and obtain a TXOP on the primary channel when the backoff counter reaches zero. Under the proposed scheme, the transmission may start with a control frame to request acknowledgement when channel status on the responder side is idle to protect the TXOP, unless the virtual CS status (NAV) is updated by receiving a PPDU or a sync counter (or synchronization timer) expires in case the sync counters is initiated, whichever occurs first. For instance, once the intended recipient detects the medium to be idle (e.g., NAV is zero and/or CCA-ED is idle), it may respond to the received control frame (e.g., RTS/CTS frame exchange may be used for TXOP protection). The intended recipient parking on the primary channel/channel segment may maintain virtual channel status (NAV) for the primary channel. Before the NAV is updated or the sync counters expires if any, the maximum allowed number of transmissions starting with a control frame exchange may be specified.

Figure 16:
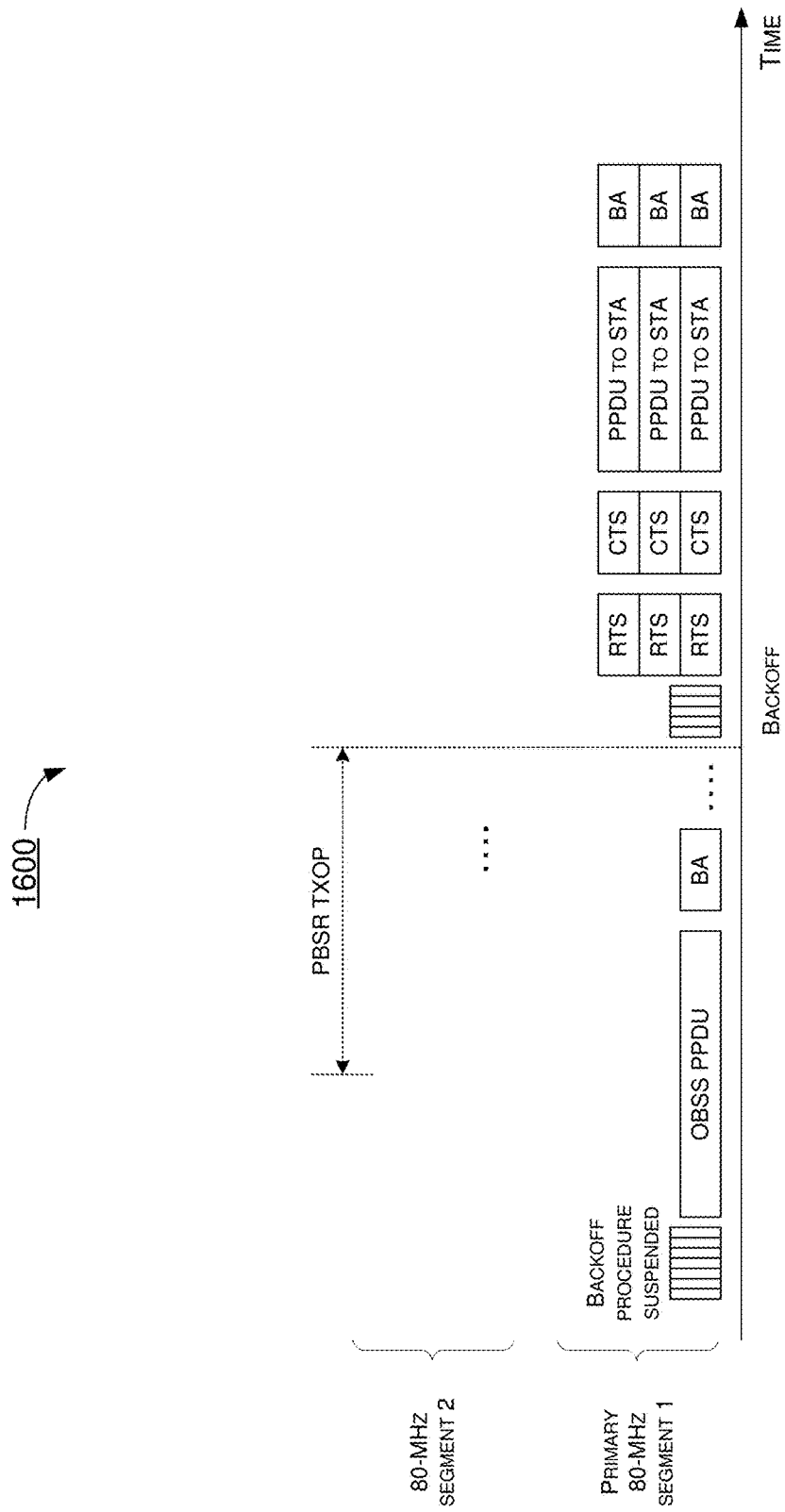
FIG. 16 is a diagram of an example scenario in accordance with the present disclosure.

FIG. 16 illustrates an example scenario 1600 in accordance with the present disclosure. In scenario 1600, when a device is switched to the primary channel after the end of a PBT, the TXOP initiated by the device on the primary channel may be protected by a control frame exchange unless the NAV is updated or a sync counter expires (if any), whichever occurs first. For instance, RTS/CTS frame exchange may be mandatory for TXOP protection on the primary channel before the NAV is updated or the sync counters expires (if any), whichever occurs first. Also, MU-RTS/CTS frame exchange may be mandatory for multi-user TXOP protection.

Thus, under the proposed schemes described above with respect to FIG. 6 FIG. 16 for supporting PBTs based on EDCA, a device may maintain two backoff function states— one (the first backoff function state) for primary channel and the other (the second backoff function state) for the selected non-primary channel(s). To obtain a PBSR TXOP on a non-primary channel, the EDCAF of the device may invoke a new PBT backoff procedure or resume a first backoff procedure as the PBT backoff for accessing the wireless medium on the selected non-primary channel(s). Under the proposed schemes, the EDCA parameters for PBT backoff may include, for example and without limitation, (1) a contention window (CW) which may be truncated by a portion of a regular CW, (2) a PBT backoff counter which may be set to an initial value based on a value of the first backoff counter, (3) an EDCA backoff CCA-ED threshold which may be adjusted, and (4) a TXOP limit which may be limited by the status of the primary channel. Additionally, under the proposed schemes, a PBT backoff procedure may be invoked in parallel or in sequence (sequentially) on multiple selected non-primary channels. Moreover, under the proposed schemes, at the end of a PBSR TXOP on a non-primary channel, the EDCAF of the device may resume a restored first backoff procedure or invoke a new backoff procedure on the primary channel. For instance, a sync timer may be initiated to start a synchronization period right at the end of the PBT. Also, a CCA-ED threshold for the backoff on the primary channel after the PBT may be adjusted in case the sync timer is not expired unless a PPDU is received before expiration of the sync timer. Furthermore, a TXOP protection may be enabled for transmissions on the primary channel in case the sync timer is not expired unless a PPDU is received before expiration of the sync timer. The TXOP protection may be enabled for PBT (e.g., with RTS/CTS frame exchange before PBT).

Figure 17:
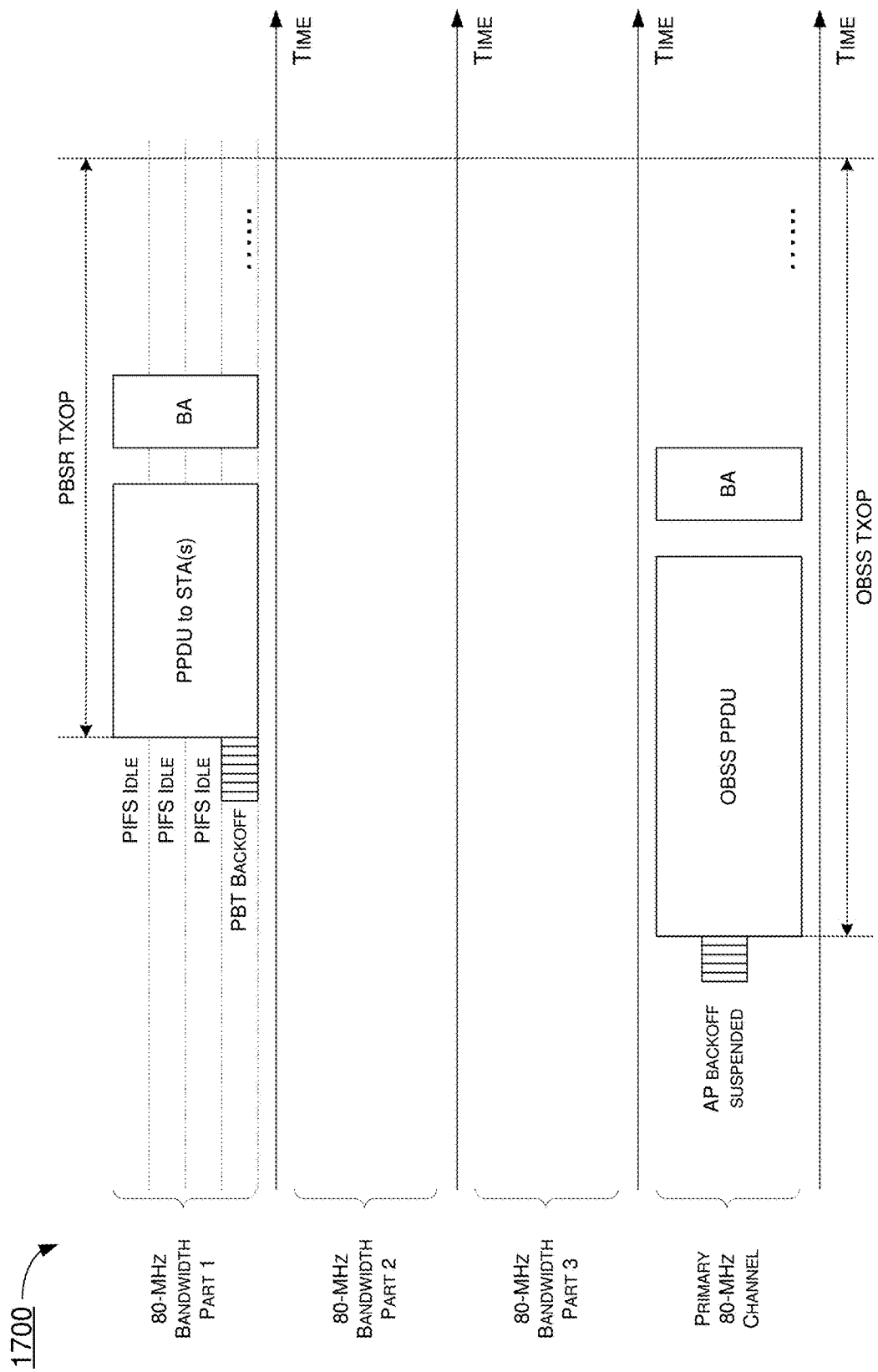
FIG. 17 is a diagram of an example scenario in accordance with the present disclosure.

FIG. 17 illustrates an example scenario 1700 in accordance with the present disclosure. In scenario 1700, an AP device (e.g., STA 110 or STA 120) operates with a 320-MHz operating bandwidth and divides the 320-MHz bandwidth into four 80-MHz channel segments. One of the four 80-MHz channel segments serves as a primary 80-MHz channel and the other three 80-MHz channel segments are denoted as 80-MHz bandwidth part 1, part 2 and part 3, respectively. Each of the 80-MHz channel segments contains four 20-MHz channels with one of which being designated/pre-configured for contention-based channel access. When the AP device detects a frame transmission (e.g., a PPDU) from an OBSS with a signal strength equal to or greater than a specific level (e.g., −62 dBm), the AP device may initiate a PBT TXOP on a pre-configured bandwidth part. For instance, the AP device may invoke a channel contention backoff procedure on the primary channel to access the medium. Additionally, the AP device may suspend its ongoing backoff procedure when the frame transmission is detected. In an event that the AP device detects an OBSS frame with a signal strength equal to or greater than a specific level (e.g., −62 dBm), the AP device may initiate the PBT TXOP on the pre-configured bandwidth part. In the present disclosure, a PBT period refers to a duration set by the TXOP duration information in the received OBSS frame.

As indicated above, before initiating a PBT TXOP, the AP device may involve a PBT backoff procedure on a specific bandwidth part (e.g., bandwidth part 4 shown in FIG. 17), for example, using EDCA channel access. A backoff timer corresponding to the backoff procedure may count down based on CCA performance on the pre-configured 20-MHz channel of the specific bandwidth part. When the backoff timer counts down to zero, the AP device may obtain a PBT TXOP in that bandwidth part. It is noteworthy that preamble puncturing may be applied on the non-primary channels which are not idle (e.g., based on PIFS idle detection immediately before the transmission). Moreover, under the proposed scheme, the PBT TXOP may be limited by the TXOP duration information in the received OBSS frame.

Figure 18:
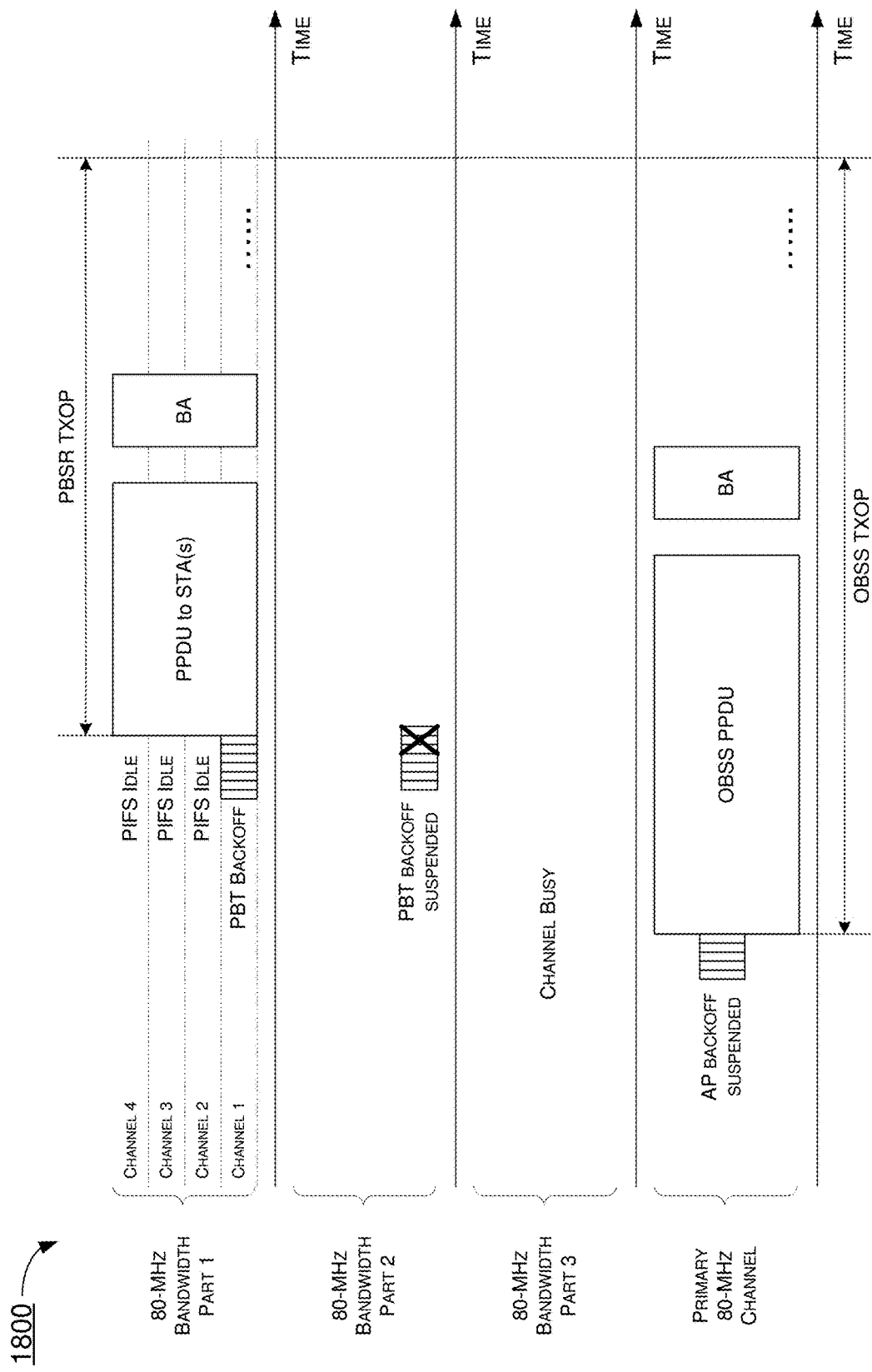
FIG. 18 is a diagram of an example scenario in accordance with the present disclosure.

FIG. 18 illustrates an example scenario 1800 in accordance with the present disclosure. In scenario 1800, an AP device (e.g., STA 110 or STA 120) operates with a 320-MHz operating bandwidth and divides the 320-MHz bandwidth into four 80-MHz channel segments. One of the four 80-MHz channel segments serves as a primary 80-MHz channel and the other three 80-MHz channel segments are denoted as 80-MHz bandwidth part 1, part 2 and part 3, respectively. Each of the 80-MHz channel segments contains four 20-MHz channels with one of which being pre-configured for contention-based channel access. In scenario 1800, a PBT backoff procedure may be invoked on bandwidth part 1 and bandwidth part 2, respectively, with the backoff timer of each backoff procedure initiated with the same random number or, alternatively, a different random number. Each backoff procedure may be performed, for example, using EDCA channel access. In scenario 1800, the backoff procedure on bandwidth part 2 may be suspended due to busy status. When the backoff timer on bandwidth part 1 counts down to zero based on CCA conditions on channel 1 (e.g., channel 1 in FIG. 18) of the bandwidth part 1, the AP device may initiate a PBT TXOP on bandwidth part 1. It is noteworthy that preamble puncturing may be applied on the non-primary channels which are not idle in bandwidth part 1. Moreover, the PBT TXOP may be limited by the duration information in the received OBSS frame (e.g., PPDU) in case the TXOP duration is indicated therein.

It is noteworthy that, in a wide bandwidth system having an operating bandwidth of 240 MHz, 160+80 MHz, 320 MHz or 160+160 MHz, the wide bandwidth may not be fully utilized in case most user devices only support narrower bandwidth, such as 80 MHz, 160 MHz, or 80+80 MHz, due to the fact that channel contention mechanism only operates on the primary channel. Under a proposed scheme in accordance with the present disclosure, a primary channel and one or more auxiliary primary channels may be configured in a BSS (e.g., BSS 130). Under the proposed scheme, a 20-MHz channel may be designated as the primary channel for a specific duration of the BSS for contention-based channel access (e.g., EDCA) operation. Moreover, one or more 20-MHz channels of different segments of the BSS operating bandwidth may be designed as auxiliary primary channel(s) for channel access when the primary 20-MHz channel is blocked/busy. For a specific time interval or duration, an auxiliary primary channel of a different channel segment may be designated as the primary channel of the BSS. An AP device may signal when the following occurs:

an auxiliary primary channel becomes the primary channel and the current primary channel becomes an auxiliary primary channel.

Under the proposed scheme, a wideband system may apply a dynamic primary channel scheme to control channel access. For instance, an AP device may designate one primary 20-MHz channel for a specific duration for contention-based channel access (e.g., EDCA). The AP device may also designate one or more 20-MHz channels of different channel segment(s) of the BSS operating bandwidth as auxiliary primary channel(s) for it to access the channel when the primary 20-MHz channel is blocked/busy. The AP device may control and signal the primary channel among the auxiliary primary 20-MHz channels located in different bandwidth parts/segments for different duration. Non-AP devices parking on the primary 20-MHz channel may contend for the channel using EDCA, and non-AP devices associated with the AP device may park on an auxiliary primary 20-MHz channel of a bandwidth part/segment. The AP device may control channel access mode for non-AP devices parking on the auxiliary primary 20-MHz channels to be restricted from contention-based channel access. For instance, the AP device may change EDCA parameters to low priority parameters or allow trigger-based UL only, or the AP device may change an MU-EDCA counter setting to a specific value to disallow EDCA.

Figure 19:
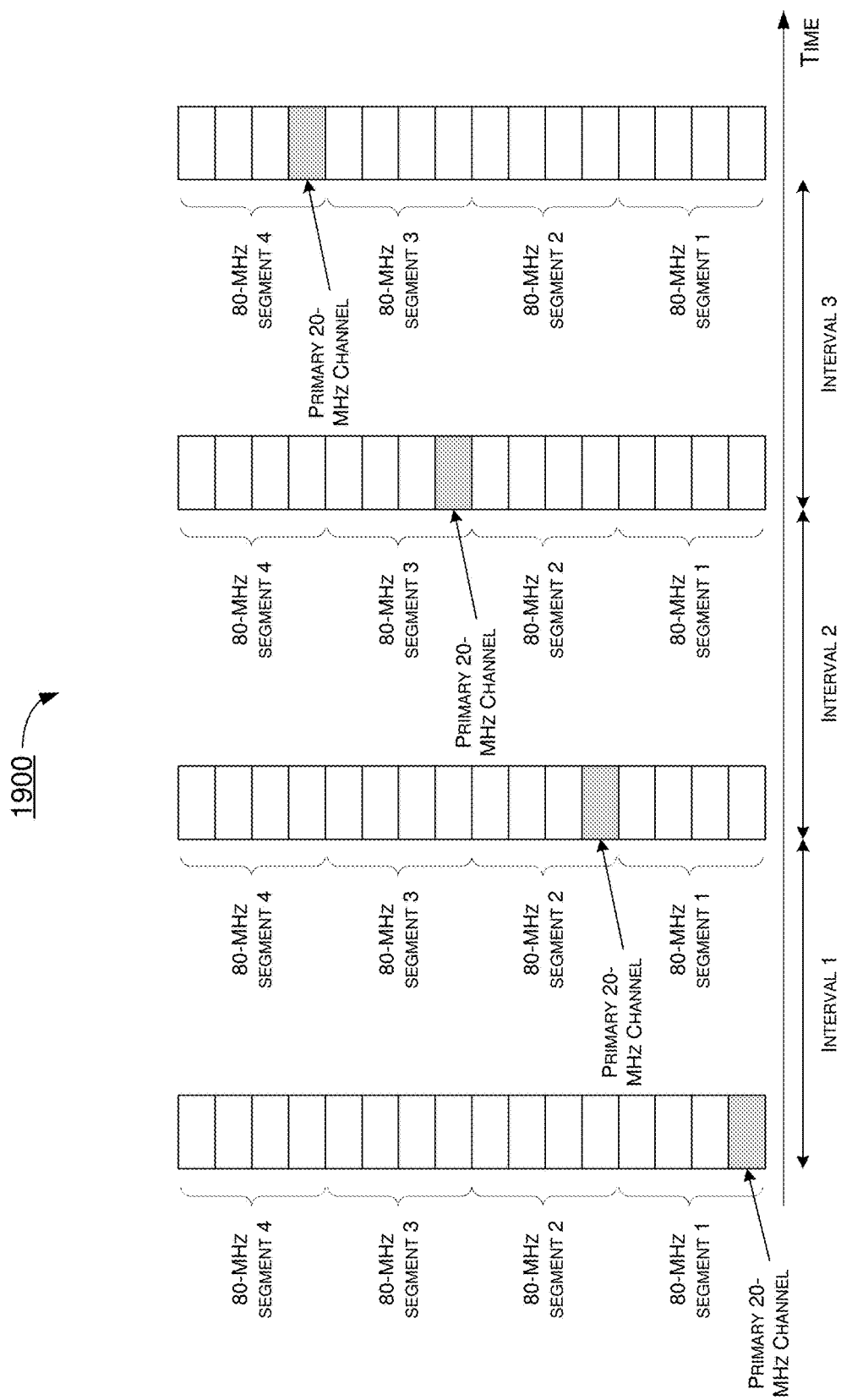
FIG. 19 is a diagram of an example scenario in accordance with the present disclosure.

FIG. 19 illustrates an example scenario 1900 of a dynamic primary channel scheme in accordance with the present disclosure. In scenario 1900, within each interval, a primary 20-MHz channel may be designated in an 80-MHz bandwidth part/segment. Additionally, only one primary 20-MHz channel may be used for channel contention. Moreover, different intervals may have different primary 20-MHz channels located in different 80-MHz bandwidths parts/segments. Furthermore, a change in the primary channel may be indicated by an AP device, and a duration of such a change may also be indicated by the AP device.

Under a proposed scheme in accordance with the present disclosure, within a specific duration one primary channel and auxiliary primary channel(s) may be used by an AP device for channel access. For instance, within a specific duration, a primary 20-MHz channel may be designated for channel access and one or more 20-mHz channels may be designated as auxiliary primary channel(s) for channel access when the primary 20-MHz channel is blocked/busy. The auxiliary primary channel(s) may be located in different bandwidth part(s)/segment(s). An auxiliary primary channel may become a default primary channel when the AP device signals a switch of the primary channel to a corresponding bandwidth part/segment. The auxiliary primary channel(s) may be dynamically accessed by the AP device based on EDCA channel contention when the primary channel is blocked/busy. The AP device may uniformly perform a random selection of one or more auxiliary primary channels for channel access when the primary channel is blocked/busy. When selecting multiple auxiliary primary channels for channel access, the one auxiliary primary channel which backs off to zero first may be used for channel access.

Figure 20:
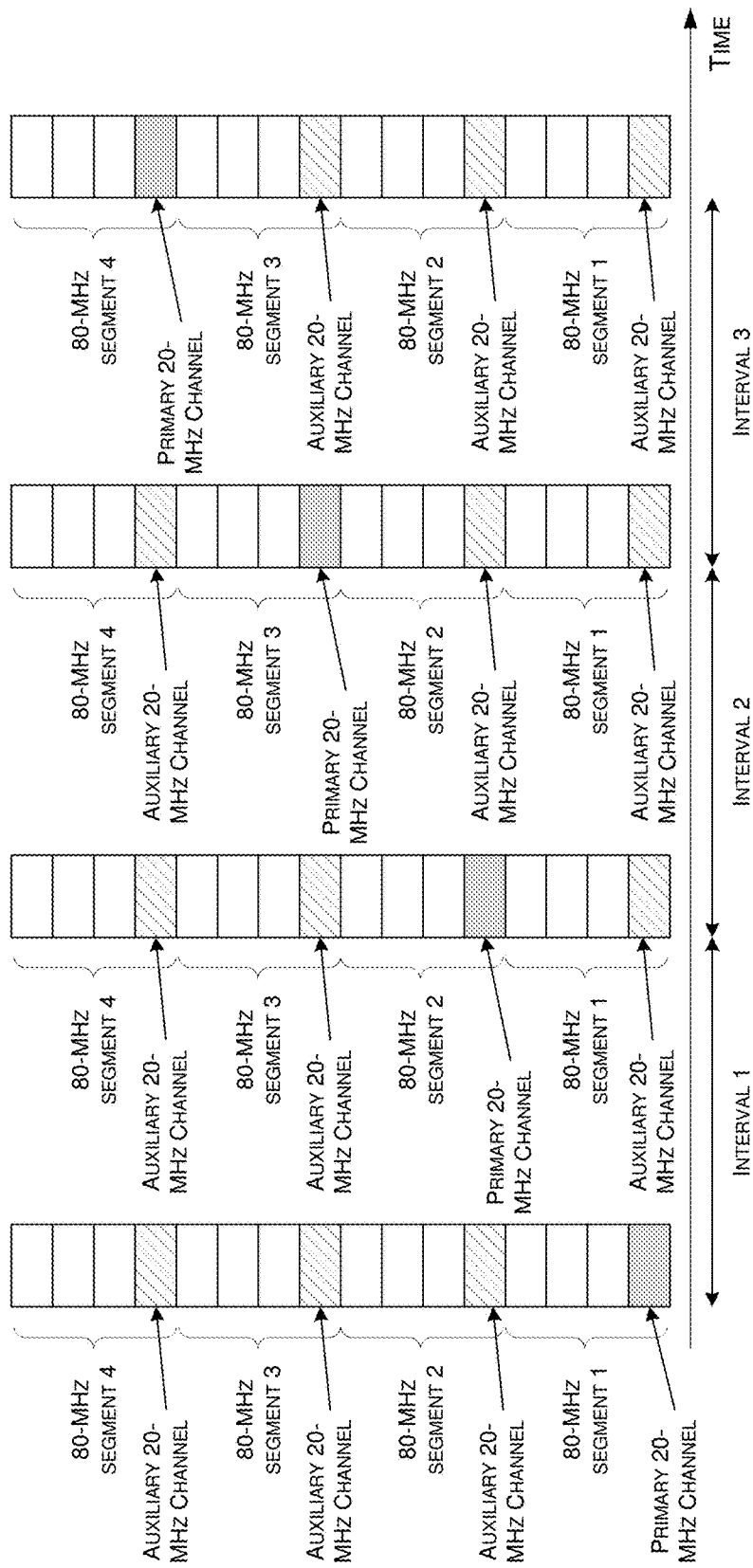
FIG. 20 is a diagram of an example scenario in accordance with the present disclosure.

FIG. 20 illustrates an example scenario 2000 of a dynamic primary channel scheme in accordance with the present disclosure. In scenario 2000, within each interval, there may be one primary 20-MHz channel designated in an 80-MHz bandwidth part/segment and multiple 20-MHz channels designated as auxiliary primary channels in other bandwidth parts/segments. An auxiliary primary 20-MHz channel in a specific interval may be the primary channel in another interval. For instance, as shown in FIG. 20, the auxiliary primary 20-MHz channel of the 80-MHz segment 2 in interval 1 may become the primary 20-MHz channel of the 80-MHz segment 2 in interval 2.

Under a proposed scheme in accordance with the present disclosure, an AP device operating in a wide bandwidth may utilize the dynamic primary channel scheme to provide flexible channel access opportunities. The AP device may partition the wide bandwidth into multiple bandwidth parts (or segments) and configure a 20-MHz channel as the primary channel or auxiliary primary channel for each bandwidth part separately. The AP device may activate a primary channel of one bandwidth part for contention-based channel access within a specific duration. Within the specific duration, the auxiliary primary channels located in other bandwidth parts may be used for the AP device to have channel access when the primary 20-MHz channel is blocked/busy. The auxiliary primary channels may be dynamically accessed based on EDCA channel contention when the primary channel is blocked/busy. The AP device may select one or more auxiliary primary channels for channel access when the primary channel is blocked/busy. When selecting multiple auxiliary primary channels for channel access, multiple backoff procedures may be performed on the auxiliary primary channels, and the first one with its backoff counter reaching zero may be used for channel access. An auxiliary primary channel may become the primary channel when the AP device indicates a change in the primary channel to the corresponding bandwidth part/segment.

Figure 21:
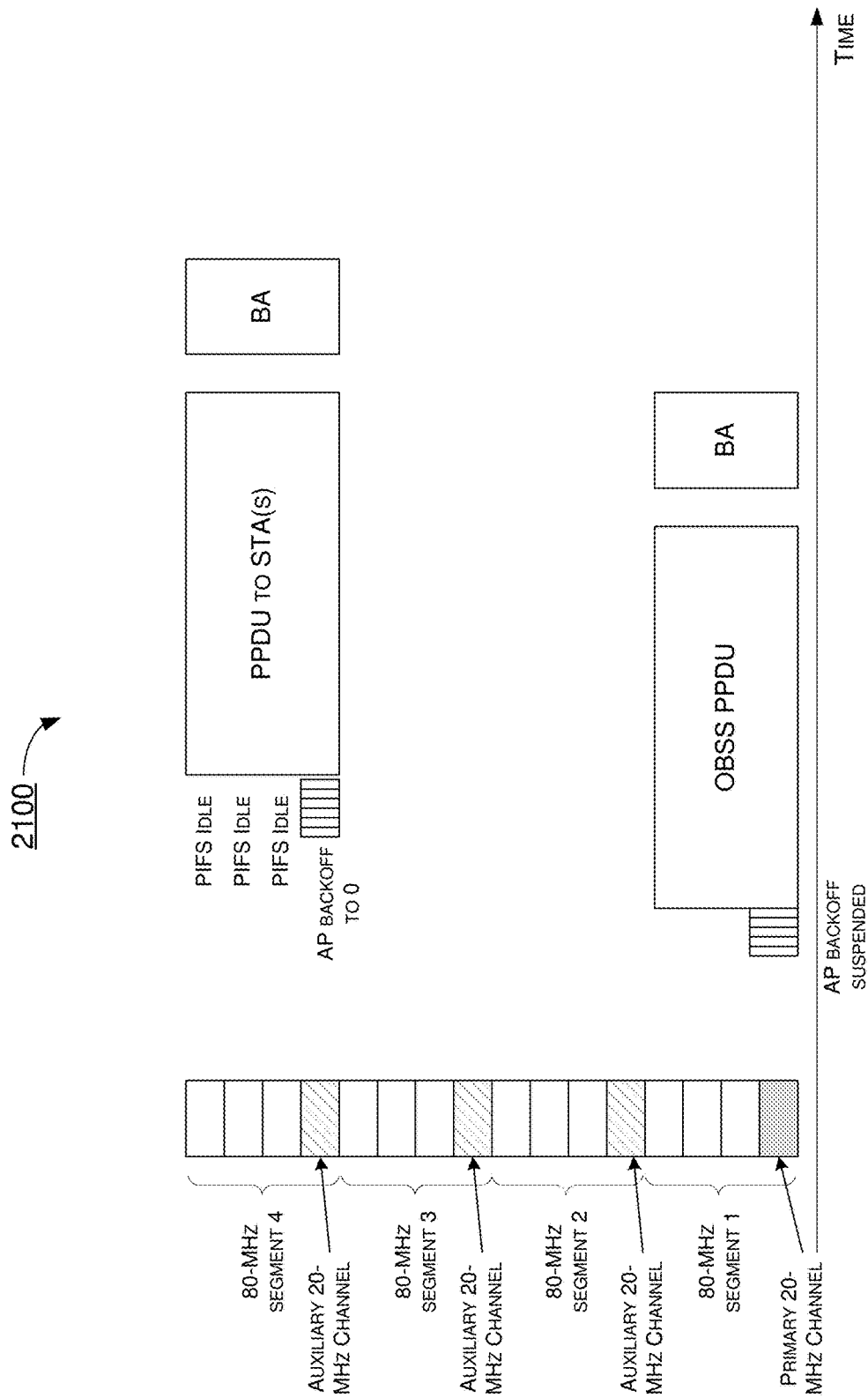
FIG. 21 is a diagram of an example scenario in accordance with the present disclosure.

FIG. 21 illustrates an example scenario 2100 of a dynamic primary channel scheme in accordance with the present disclosure. In scenario 2100, an AP device may select one auxiliary primary channel for channel access when the primary channel is blocked due to interference. A backoff counter may start to count down based on a CCA detection on the selected auxiliary primary channel. ED detection may be performed on other channels within the bandwidth part/segment (e.g., PIFS check immediately before transmission).

Figure 22:
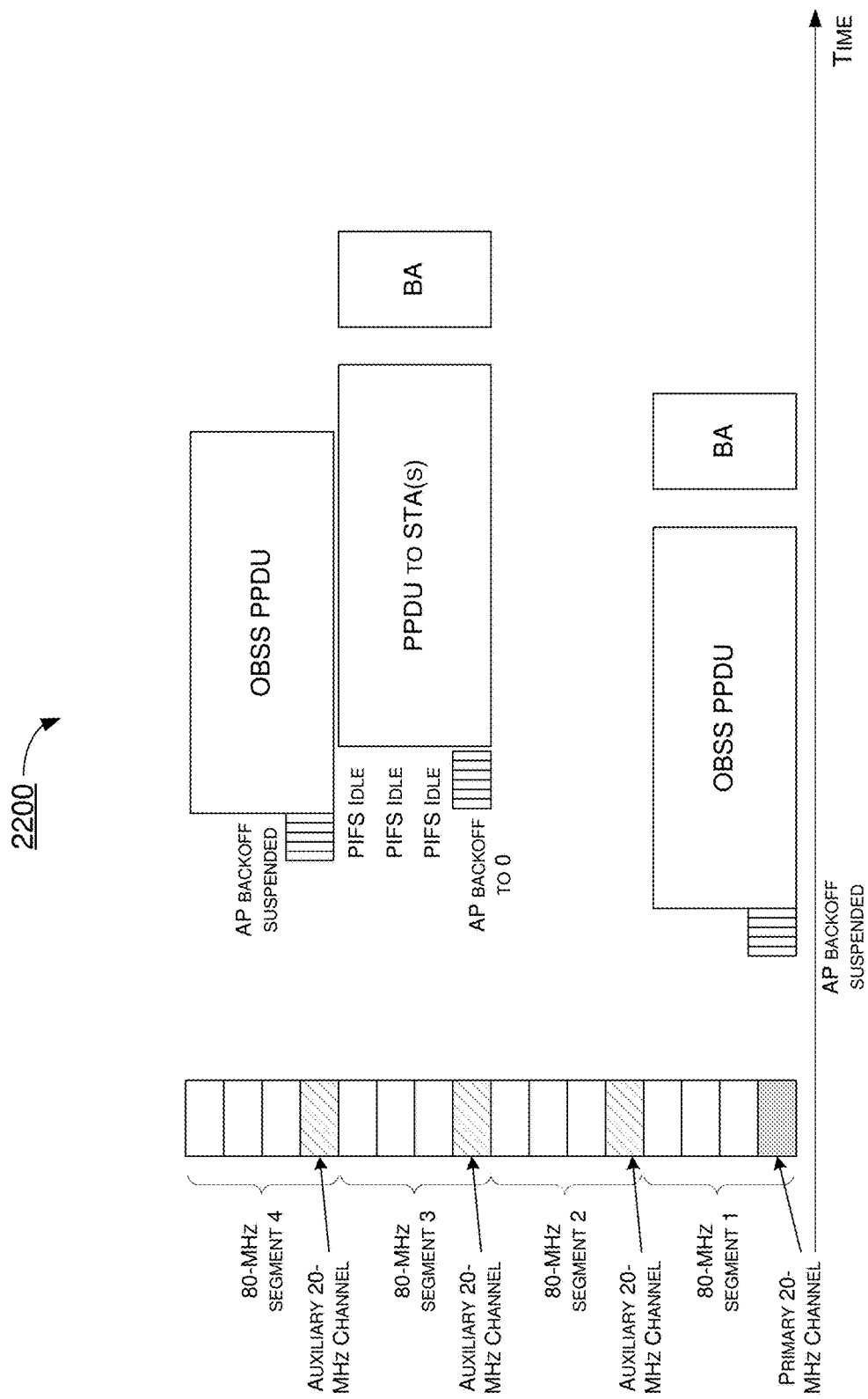
FIG. 22 is a diagram of an example scenario in accordance with the present disclosure.

FIG. 22 illustrates an example scenario 2200 of a dynamic primary channel scheme in accordance with the present disclosure. In scenario 2200, an AP device may select one auxiliary primary channel for channel access when the primary channel is blocked. A backoff counter may start to count down based on a CCA detection on the selected auxiliary primary channel. In case the selected auxiliary primary channel is also blocked, then the AP device may select another auxiliary primary channel for channel access. In case the primary 20-MHz channel is unblocked (e.g., NAV equals to zero or physical CS indicates idle), then the AP device may switch back to the primary channel for channel access.

Figure 23:
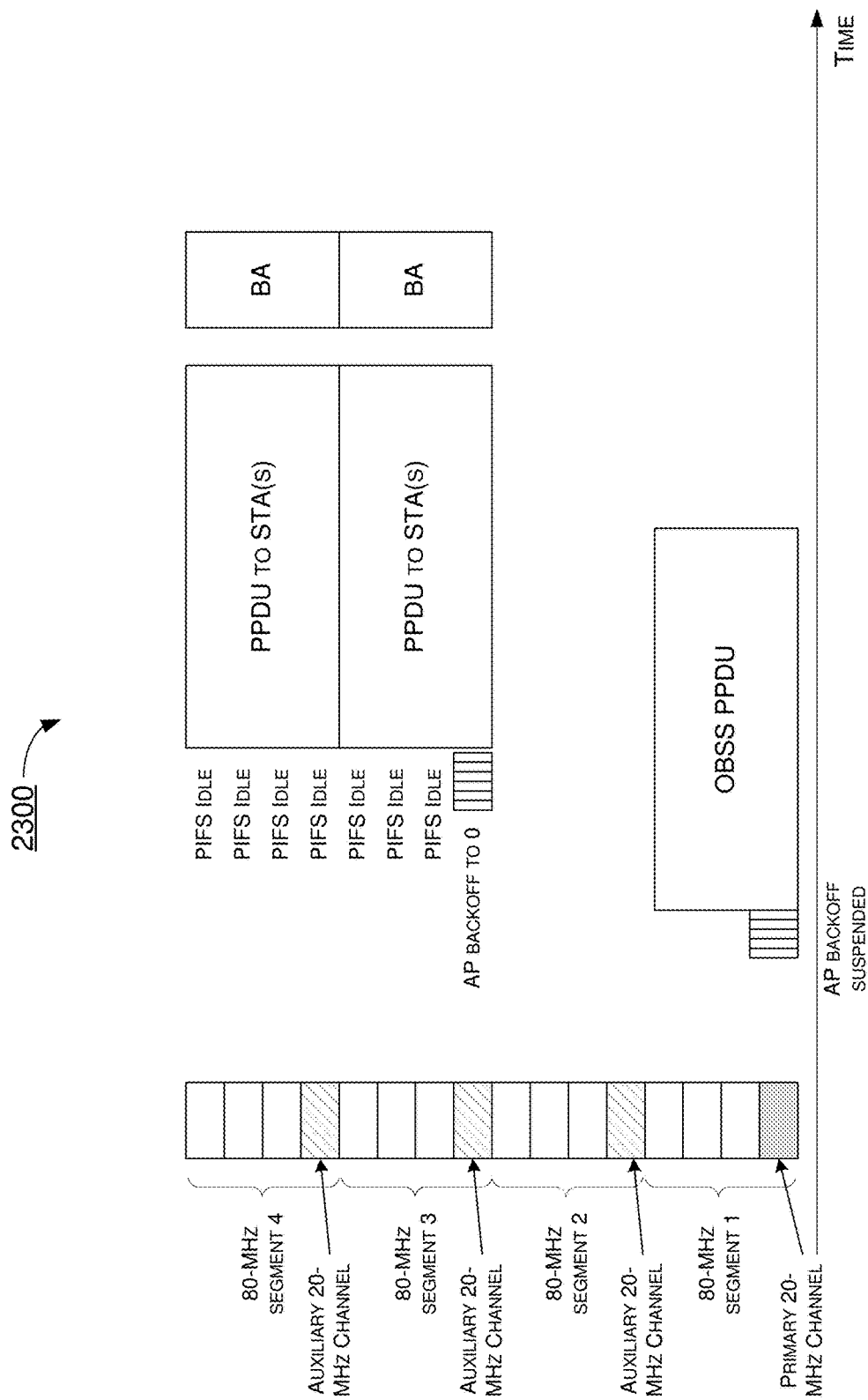
FIG. 23 is a diagram of an example scenario in accordance with the present disclosure.

FIG. 23 illustrates an example scenario 2300 of a dynamic primary channel scheme in accordance with the present disclosure. In scenario 2300, the AP device may select one auxiliary primary channel for channel access when the primary channel is blocked. A backoff counter may start to count down based on a CCA detection on the selected auxiliary primary channel. ED detection on other channels within multiple bandwidth parts/segments may be performed (e.g., PIFS check immediately before transmission).

Figure 24:
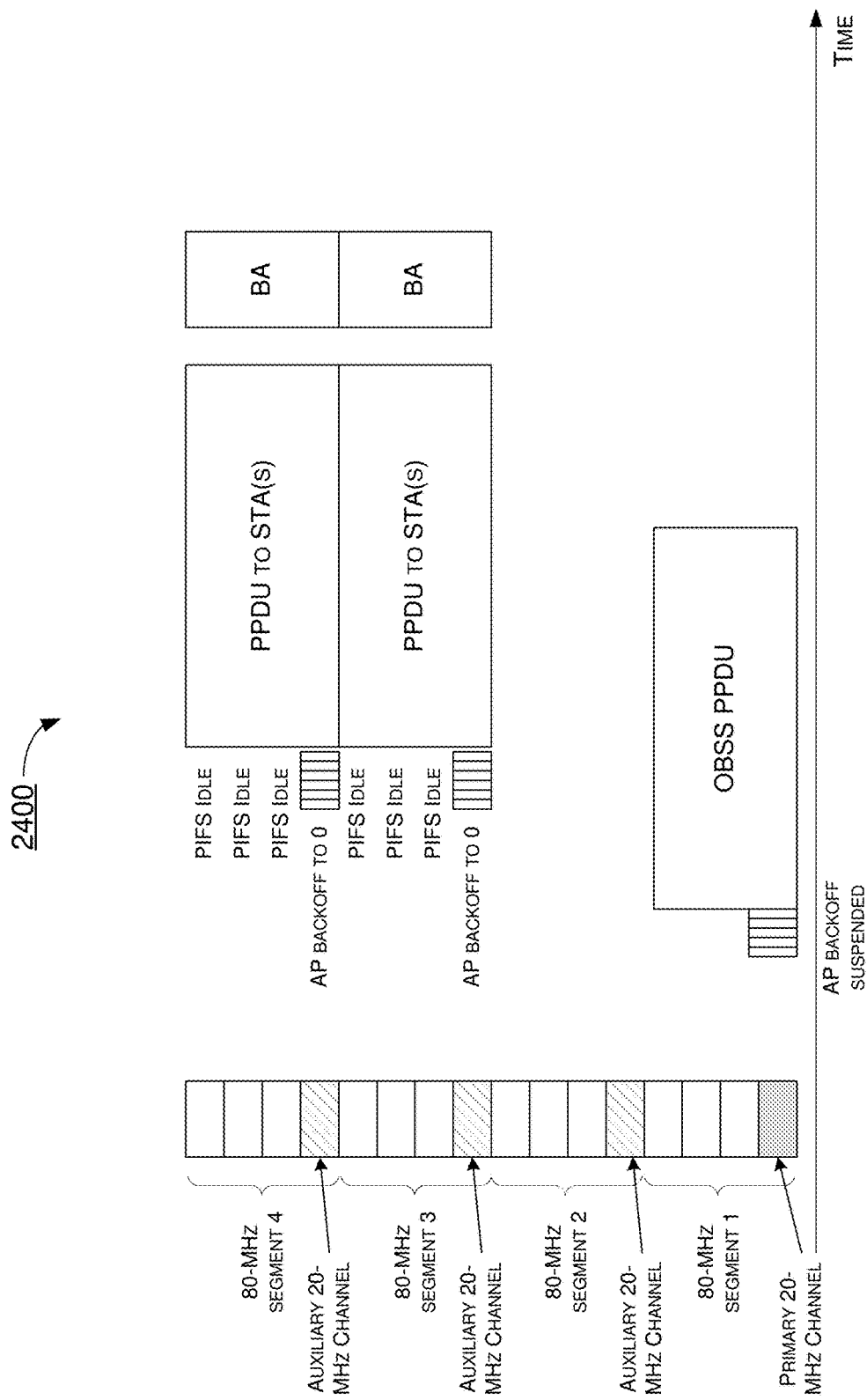
FIG. 24 is a diagram of an example scenario in accordance with the present disclosure.

FIG. 24 illustrates an example scenario 2400 of a dynamic primary channel scheme in accordance with the present disclosure. In scenario 2400, an AP device may select multiple auxiliary primary channels for channel access when the primary channel is blocked. EDCA backoff procedure may be performed on each selected auxiliary primary channel with an initial value. The initial value of each backoff counter may be the same or different. A backoff counter may start to count down based on a CCA detection on the selected auxiliary primary channels respectively. ED detection on other channels within each bandwidth part/segment may be performed (e.g., PIFS check immediately before transmission).

Figure 25:
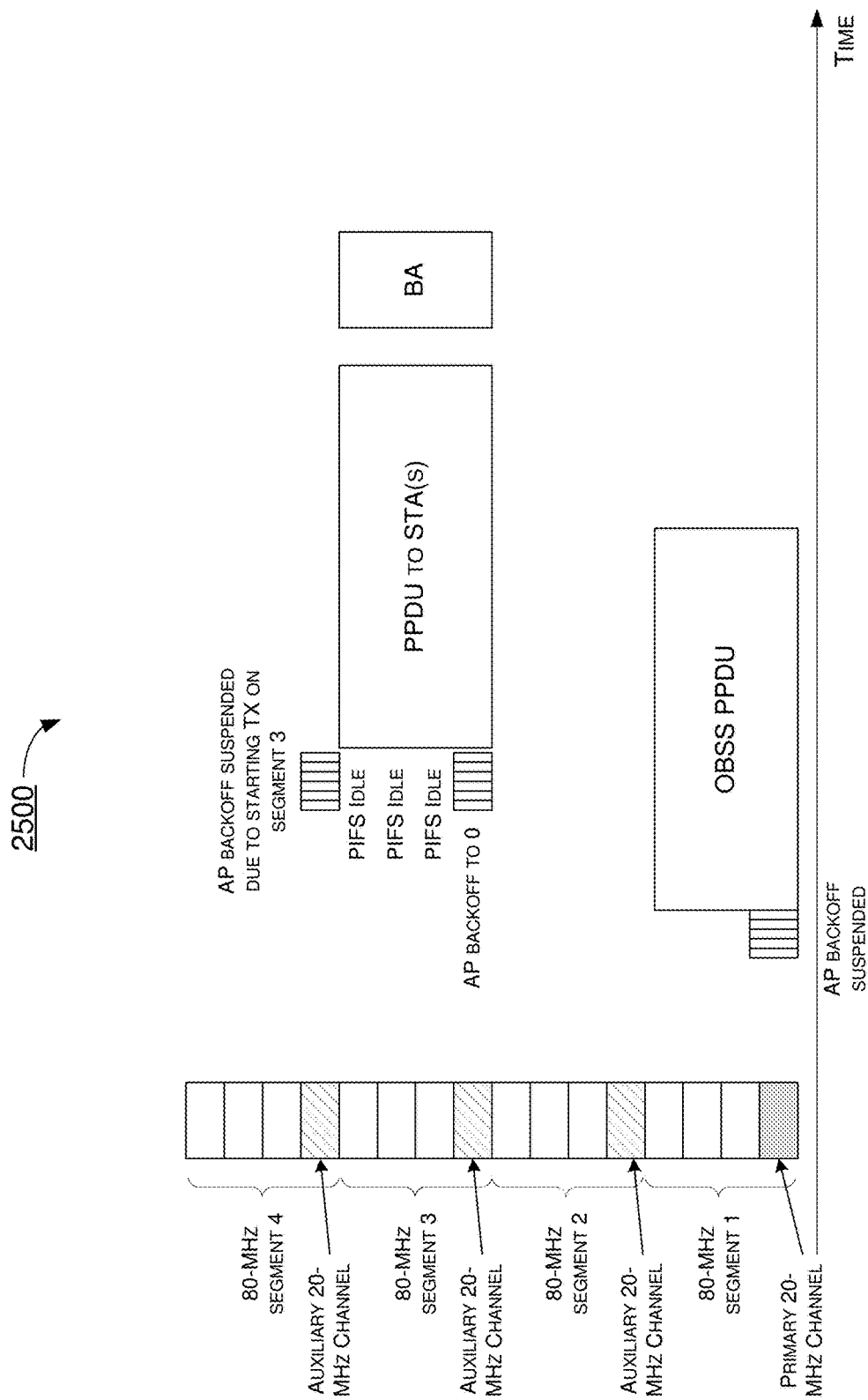
FIG. 25 is a diagram of an example scenario in accordance with the present disclosure.

FIG. 25 illustrates an example scenario 2500 of a dynamic primary channel scheme in accordance with the present disclosure. In scenario 2500, an AP device may select multiple auxiliary primary channels for channel access when the primary channel is blocked. EDCA backoff procedure may be performed on each selected auxiliary primary channel with its own initial value. A backoff counter may start to count down based on a CCA detection on the selected auxiliary primary channels respectively. In scenario 2500, backoff on segment 4 may be suspended after the backoff on segment 3 counts down to zero.

Figure 26:
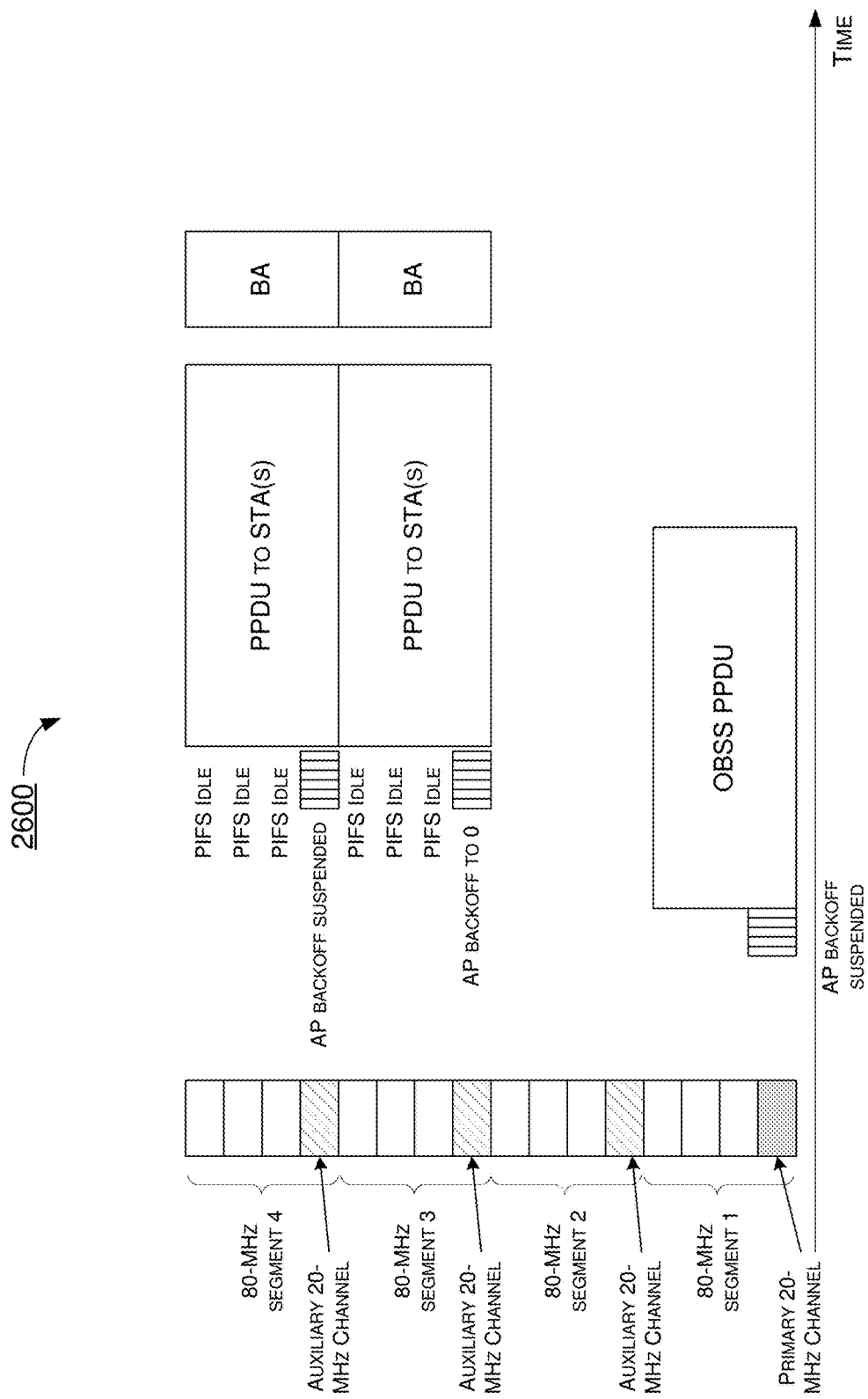
FIG. 26 is a diagram of an example scenario in accordance with the present disclosure.

FIG. 26 illustrates an example scenario 2600 of a dynamic primary channel scheme in accordance with the present disclosure. In scenario 2600, an AP device may select multiple auxiliary primary channels for channel access when the primary channel is blocked. EDCA backoff procedure may be performed on each selected auxiliary primary channel with its own initial value. A backoff counter may start to count down based on a CCA detection on the selected auxiliary primary channels respectively. In scenario 2600, backoff on segment 4 may be suspended after the backoff on segment 3 counts down to zero. Moreover, ED detection on other channels including the auxiliary primary channel of segment 4 may be performed (e.g., PIFS check immediately before transmission).

Thus, under the proposed schemes described above with respect to FIG. 19-FIG. 26, one primary channel and multiple auxiliary primary channels may be designated for a BSS (e.g., BSS 130) within a time interval or as indicated by system information. For instance, for a BSS with a 320-MHz operating bandwidth, the 320-MHz bandwidth may be divided into four 80-MHz bandwidth segments with one 20-MHz primary channel designated for each one of the 80-MHz bandwidth segments to have a total of four primary channels in the 320-MHz operating bandwidth. Among the four primary channels, one primary channel may be a designated primary channel for the entire 320-MHz bandwidth, and the other three primary channels may be auxiliary primary channels. An AP device of the BSS may change the designated primary channel to be an auxiliary primary channel for a certain time interval or as explicitly indicated.

Moreover, under the proposed schemes described above with respect to FIG. 19~FIG. 26, flexible channel access rules may be applied based on status of the designated primary channel and auxiliary primary channels. For instance, the AP device may perform EDCA-based channel contention on the current designated primary channel. The auxiliary primary channels in the other 80-MHz bandwidth segments may be used for the AP device to perform EDCA-based channel contention when the designated primary channel is blocked/busy. When selecting multiple auxiliary primary channels for channel access, one or more backoff procedures may be performed on the auxiliary primary channels. The first one of such backoff procedures with its backoff counter counting down to zero may be used for channel access. Accordingly, similar to the non-primary channels described above with respect to FIG. 2~FIG. 18, in the examples shown in FIG. 19~FIG. 26 auxiliary primary channels may be used for channel contention when the primary channel is blocked/busy, thereby improving bandwidth utilization when the primary channel is not available.

Illustrative Implementations

FIG. 27 illustrates an example system 2700 having at least an example apparatus 2710 and an example apparatus 2720 in accordance with an implementation of the present disclosure. Each of apparatus 2710 and apparatus 2720 may perform various functions to implement schemes, techniques, processes, and methods described herein pertaining to transmission with partial bandwidth spectrum reuse in wireless communications, including the various schemes described above with respect to various proposed designs, concepts, schemes, systems, and methods described above as well as processes described below. For instance, apparatus 2710 may be implemented in one of STA 110 or STA 120 and apparatus 2720 may be implemented in the other of STA 110 or STA 120, or vice versa.

Each of apparatus 2710 and apparatus 2720 may be a part of an electronic apparatus, which may be a STA or an AP, such as a portable or mobile apparatus, a wearable apparatus, a wireless communication apparatus or a computing apparatus. When implemented in a STA, each of apparatus 2710 and apparatus 2720 may be implemented in a smartphone, a smart watch, a personal digital assistant, a digital camera, or a computing equipment such as a tablet computer, a laptop computer, or a notebook computer. Each of apparatus 2710 and apparatus 2720 may also be a part of a machine type apparatus, which may be an IoT apparatus such as an immobile or a stationary apparatus, a home apparatus, a wire communication apparatus, or a computing apparatus. For instance, each of apparatus 2710 and apparatus 2720 may be implemented in a smart thermostat, a smart fridge, a smart door lock, a wireless speaker, or a home control center. When implemented in or as a network apparatus, apparatus 2710 and/or apparatus 2720 may be implemented in a network node, such as an AP in a WLAN.

In some implementations, each of apparatus 2710 and apparatus 2720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 2710 and apparatus 2720 may be implemented in or as a STA or an AP. Each of apparatus 2710 and apparatus 2720 may include at least some of those components shown in FIG. 27 such as a processor 2712 and a processor 2722, respectively, for example. Each of apparatus 2710 and apparatus 2720 may further include one or more other components not pertinent to the proposed scheme of the present disclosure (e.g., internal power supply, display device and/or user interface device), and, thus, such component(s) of apparatus 2710 and apparatus 2720 are neither shown in FIG. 27 nor described below in the interest of simplicity and brevity.

In one aspect, each of processor 2712 and processor 2722 may be implemented in the form of one or more single-core processors, one or more multi-core processors, one or more RISC processors or one or more CISC processors. That is, even though a singular term "a processor" is used herein to refer to processor 2712 and processor 2722, each of processor 2712 and processor 2722 may include multiple processors in some implementations and a single processor in other implementations in accordance with the present disclosure. In another aspect, each of processor 2712 and processor 2722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2712 and processor 2722 is a special-purpose machine specifically designed, arranged, and configured to perform specific tasks including those pertaining to transmission with partial bandwidth spectrum reuse in wireless communications in accordance with various implementations of the present disclosure.

In some implementations, apparatus 2710 may also include a transceiver 2716 coupled to processor 2712. Transceiver 2716 may include a transmitter capable of wirelessly transmitting and a receiver capable of wirelessly receiving data. In some implementations, apparatus 2720 may also include a transceiver 2726 coupled to processor 2722. Transceiver 2726 may include a transmitter capable of wirelessly transmitting and a receiver capable of wirelessly receiving data.

In some implementations, apparatus 2710 may further include a memory 2714 coupled to processor 2712 and capable of being accessed by processor 2712 and storing data therein. In some implementations, apparatus 2720 may further include a memory 2724 coupled to processor 2722 and capable of being accessed by processor 2722 and storing data therein. Each of memory 2714 and memory 2724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2714 and memory 2724 may include a type of read-only memory (ROM) such as mask ROM, programmable ROM (PROM), erasable programmable ROM (EPROM) and/or electrically erasable programmable ROM (EEPROM). Alternatively, or additionally, each of memory 2714 and memory 2724 may include a type of non-volatile random-access memory (NVRAM) such as flash memory, solid-state memory, ferroelectric RAM (FeRAM), magnetoresistive RAM (MRAM) and/or phase-change memory.

Each of apparatus 2710 and apparatus 2720 may be a communication entity capable of communicating with each other using various proposed schemes in accordance with the present disclosure. For illustrative purposes and without limitation, a description of capabilities of apparatus 2710, as one of STA 110 and STA 120, and apparatus 2720, as the other of STA 110 and STA 120, is provided below. It is noteworthy that, although the example implementations described below are provided in the context of WLAN, the same may be implemented in other types of networks.

Under a proposed scheme pertaining to transmission with partial bandwidth spectrum reuse in wireless communications in accordance with the present disclosure, processor 2712 of apparatus 2710 may detect, via transceiver 2716, a primary channel busy (e.g., by receiving a frame on the primary channel) for an operating bandwidth having a plurality of channel segments comprising the primary channel and at least one non-primary channel. Additionally, processor 2712 may obtain, via transceiver 2716, a TXOP (e.g., PBSR TXOP) through a first non-primary channel of the at least one non-primary channel responsive to detecting the primary channel busy. Moreover, processor 2712 may perform, via transceiver 2716, a transmission at least on the first non-primary channel during the TXOP.

In some implementations, in detecting the primary channel busy, processor 2712 may perform certain operations. For instance, processor 2712 may perform a channel contention backoff procedure on the primary channel to access a medium of the primary channel. Additionally, processor 2712 may suspend the backoff procedure responsive to detecting the primary channel busy.

In some implementations, in detecting the primary channel busy, processor 2712 may receive a frame from a transmission on the primary channel by an OBSS. Alternatively, processor 2712 may detect a signal energy on the primary channel being higher than an energy detection threshold.

In some implementations, in obtaining the TXOP, processor 2712 may perform additional operations. For instance, processor 2712 may resume a suspended backoff procedure or initiating a new backoff procedure such that a backoff counter counts down on the first non-primary channel. Moreover, processor 2712 may initiate the TXOP on the first non-primary channel responsive to the backoff counter counting down to zero on the first non-primary channel. Furthermore, processor 2712 may determine a bandwidth of the TXOP according to a medium status of each of the at least one non-primary channel other than the first non-primary channel during a specific time interval before a start of TXOP. In some implementations, the specific time interval may include a PIFS interval.

In some implementations, in resuming the suspended backoff procedure or in initiating the new backoff procedure, processor 2712 may perform one backoff procedure on the first non-primary channel within a selected channel segment. Alternatively, processor 2712 may perform multiple backoff procedures on multiple non-primary channels of the at least one non-primary channel each within a respective channel segment.

In some implementations, in initiating the TXOP, processor 2712 may set a duration of the TXOP according to duration information obtained from a duration of the TXOP or PPDU length information of the transmission by the OBSS in the received frame. Alternatively, processor 2712 may set the duration of the TXOP to a specified value.

In some implementations, in performing the transmission on the first non-primary channel, processor 2712 may perform a DL transmission to at least one non-AP device on the at least one non-primary channel. Alternatively, processor 2712 may trigger an UL transmission from the at least one non-AP device on the at least one non-primary channel.

In some implementations, in obtaining the TXOP, processor 2712 may perform certain operations. For instance, processor 2712 may maintain a first backoff function state for the primary channel and maintaining a second backoff function state for the first non-primary channel. Additionally, processor 2712 may perform EDCA backoff on the primary channel. Moreover, processor 2712 may suspend the EDCA backoff on the primary channel upon detecting that the primary channel is busy. Furthermore, processor 2712 may store a value of each of a plurality of backoff parameters of the EDCA backoff on the primary channel as the first backoff function state. In such cases, the plurality of backoff parameters may include at least a backoff counter, a contention window, and a QoS STA retry counter.

In some implementations, the at least one non-primary channel may include a plurality of non-primary channels including the first non-primary channel. In such cases, in obtaining the TXOP, processor 2712 may perform additional operations. For instance, processor 2712 may invoke at least one backoff procedure by invoking a respective backoff procedure of the at least one backoff procedure on a corresponding one of the plurality of non-primary channels. Moreover, processor 2712 may select the first non-primary channel on which to initiate the TXOP responsive to the respective backoff procedure on the first non-primary channel counting down to zero first among the plurality of non-primary channels.

In some implementations, in invoking the at least one backoff procedure, processor 2712 may invoke the at least one backoff procedure in parallel or sequentially by initializing at least one new backoff procedure on the primary channel.

In some implementations, in an event that the invoking of the at least one backoff procedure involves resuming the suspended backoff procedure, a respective backoff counter of each of the at least one backoff procedure may be initialized based on a first backoff function state for the primary channel. In some implementations, in an event that the invoking of the at least one backoff procedure involves initializing a new backoff procedure for the first non-primary channel, a respective backoff counter of each of the at least one backoff procedure may be initialized based on an access category. In some implementations, a second backoff function state for the first non-primary channel may be reset. Moreover, a previously stored first backoff function state may be restored on the primary channel.

In some implementations, in obtaining the TXOP, processor 2712 may perform an exchange of RTS and CTS frames preceding any data or management frame transmissions within the TXOP.

In some implementations, after the TXOP, processor 2712 may either: (a) resume a previous backoff procedure suspended on the primary channel responsive to detecting the primary channel busy; or (b) invoke a new backoff procedure on the primary channel.

In some implementations, after the TXOP, processor 2712 may perform an exchange of RTS and CTS frames preceding any data or management frame transmission when obtaining a TXOP on the primary channel. In some implementations, in performing the exchange of RTS and CTS frames, processor 2712 may perform the exchange of RTS and CTS frames in response to at least one of the following: (1) a synchronization timer (if any) not having expired, and (2) a NAV not being updated by receiving a PPDU.

In some implementations, processor 2712 may perform additional operations. For instance, for each of the plurality of channel segments each having a plurality of channels, processor 2712 may designate one of the plurality of channels as a primary channel for the respective channel segment to result in a plurality of primary channels for the plurality of channel segments. Additionally, processor 2712 may designate a first primary channel of the plurality of primary channels as a current primary channel for the operating bandwidth with remaining one or more of the plurality of primary channels being one or more auxiliary primary channels. Moreover, processor 2712 may detect that the current primary channel for the operating bandwidth is busy. In response, processor 2712 may obtain one other TXOP through a first auxiliary primary channel of the one or more auxiliary primary channels.

In some implementations, in obtaining the other TXOP through the first auxiliary primary channel, processor 2712 may perform certain operations. For instance, processor 2712 may perform a respective backoff procedure on the one or more auxiliary primary channels. Additionally, processor 2712 may obtain the other TXOP through one of the one or more auxiliary primary channels for which the respective backoff procedure counts down to zero first among all the one or more auxiliary primary channels. Moreover, processor 2712 may perform a transmission on at least the first auxiliary primary channel.

In some implementations, processor 2712 may perform additional operations. For instance, for a specific duration, processor 2712 may designate one of the one or more auxiliary primary channels to be a new primary channel for the operating bandwidth. Moreover, processor 2712 may change the current primary channel for the operating bandwidth to be one of the one or more auxiliary primary channels.

Illustrative Processes

FIG. 28 illustrates an example process 2800 in accordance with an implementation of the present disclosure. Process 2800 may represent an aspect of implementing various proposed designs, concepts, schemes, systems, and methods described above. More specifically, process 2800 may represent an aspect of the proposed concepts and schemes pertaining to transmission with partial bandwidth spectrum reuse in wireless communications in accordance with the present disclosure. Process 2800 may include one or more operations, actions, or functions as illustrated by one or more of blocks 2810, 2820 and 2830. Although illustrated as discrete blocks, various blocks of process 2800 may be divided into additional blocks, combined into fewer blocks, or eliminated, depending on the desired implementation. Moreover, the blocks/sub-blocks of process 2800 may be executed in the order shown in FIG. 28 or, alternatively in a different order. Furthermore, one or more of the blocks/sub-blocks of process 2800 may be executed repeatedly or iteratively. Process 2800 may be implemented by or in apparatus 2710 and apparatus 2720 as well as any variations thereof. Solely for illustrative purposes and without limiting the scope, process 2800 is described below in the context of apparatus 2710 implemented in or as STA 110 and apparatus 2720 implemented in or as STA 120 of a wireless network such as a WLAN in network environment 100 in accordance with one or more of IEEE 802.11 standards. Process 2800 may begin at block 2810.

At 2810, process 2800 may involve processor 2712 of apparatus 2710 detecting, via transceiver 2716, a primary channel busy for an operating bandwidth having a plurality of channel segments comprising the primary channel and at least one non-primary channel. Process 2800 may proceed from 2810 to 2820.

At 2820, process 2800 may involve processor 2712 obtaining, via transceiver 2716, a TXOP (e.g., PBSR TXOP) through a first non-primary channel of the at least one non-primary channel responsive to the receiving. Process 2800 may proceed from 2820 to 2830.

At 2830, process 2800 may involve processor 2712 performing, via transceiver 2716, a transmission at least on the first non-primary channel during the TXOP.

In some implementations, in detecting the primary channel busy, process 2800 may involve processor 2712 performing certain operations. For instance, process 2800 may involve processor 2712 performing a channel contention backoff procedure on the primary channel to access a medium of the primary channel. Additionally, process 2800 may involve processor 2712 suspending the backoff procedure responsive to detecting the primary channel busy.

In some implementations, in detecting the primary channel busy, process 2800 may involve processor 2712 receiving a frame from a transmission on the primary channel by an OBSS. Alternatively, process 2800 may involve processor 2712 detecting a signal energy on the primary channel being higher than an energy detection threshold.

In some implementations, in obtaining the TXOP, process 2800 may involve processor 2712 performing additional operations. For instance, process 2800 may involve processor 2712 resuming a suspended backoff procedure or initiating a new backoff procedure such that a backoff counter counts down on the first non-primary channel. Moreover, process 2800 may involve processor 2712 initiating the TXOP on the first non-primary channel responsive to the backoff counter counting down to zero on the first non-primary channel. Furthermore, process 2800 may involve processor 2712 determining a bandwidth of the TXOP according to a medium status of each of the at least one non-primary channel other than the first non-primary channel during a specific time interval before a start of TXOP. In some implementations, the specific time interval may include a PIFS interval.

In some implementations, in resuming the suspended backoff procedure or in initiating the new backoff procedure, process 2800 may involve processor 2712 performing one backoff procedure on the first non-primary channel within a selected channel segment. Alternatively, process 2800 may involve processor 2712 performing multiple backoff procedures on multiple non-primary channels of the at least one non-primary channel each within a respective channel segment.

In some implementations, in initiating the TXOP, process 2800 may involve processor 2712 setting a duration of the TXOP according to duration information obtained from a duration of the TXOP or PPDU length information of the transmission by the OBSS in the received frame. Alternatively, process 2800 may involve processor 2712 setting the duration of the TXOP to a specified value.

In some implementations, in performing the transmission on the first non-primary channel, process 2800 may involve processor 2712 performing a DL transmission to at least one non-AP device on the at least one non-primary channel. Alternatively, process 2800 may involve processor 2712 triggering an UL transmission from the at least one non-AP device on the at least one non-primary channel.

In some implementations, in obtaining the TXOP, process 2800 may involve processor 2712 performing certain operations. For instance, process 2800 may involve processor 2712 maintaining a first backoff function state for the primary channel and maintaining a second backoff function state for the first non-primary channel. Additionally, process 2800 may involve processor 2712 performing EDCA backoff on the primary channel. Moreover, process 2800 may involve processor 2712 suspending the EDCA backoff on the primary channel upon detecting that the primary channel is busy. Furthermore, process 2800 may involve processor 2712 storing a value of each of a plurality of backoff parameters of the EDCA backoff on the primary channel as the first backoff function state. In such cases, the plurality of backoff parameters may include at least a backoff counter, a contention window, and a QoS STA retry counter.

In some implementations, the at least one non-primary channel may include a plurality of non-primary channels including the first non-primary channel. In such cases, in obtaining the TXOP, process 2800 may involve processor 2712 performing additional operations. For instance, process 2800 may involve processor 2712 invoking at least one backoff procedure by invoking a respective backoff procedure of the at least one backoff procedure on a corresponding one of the plurality of non-primary channels. Moreover, process 2800 may involve processor 2712 selecting the first non-primary channel on which to initiate the TXOP responsive to the respective backoff procedure on the first non-primary channel counting down to zero first among the plurality of non-primary channels.

In some implementations, in invoking the at least one backoff procedure, process 2800 may involve processor 2712 invoking the at least one backoff procedure in parallel or sequentially by initializing at least one new backoff procedure or resuming a suspended backoff procedure on the primary channel.

In some implementations, in an event that the invoking of the at least one backoff procedure involves resuming the suspended backoff procedure, a respective backoff counter of each of the at least one backoff procedure may be initialized based on a first backoff function state for the primary channel. In some implementations, in an event that the invoking of the at least one backoff procedure involves initializing a new backoff procedure for the first non-primary channel, a respective backoff counter of each of the at least one backoff procedure may be initialized based on an access category. In some implementations, a second backoff function state for the first non-primary channel may be reset. Moreover, a previously stored first backoff function state may be restored on the primary channel.

In some implementations, in obtaining the TXOP, process 2800 may also involve processor 2712 performing an exchange of RTS and CTS frames preceding any data or management frame transmissions within the TXOP.

In some implementations, after the TXOP, process 2800 may involve processor 2712 either: (a) resuming a previous backoff procedure suspended on the primary channel responsive to detecting the primary channel busy; or (b) invoking a new backoff procedure on the primary channel.

In some implementations, after the TXOP, process 2800 may involve processor 2712 performing an exchange of RTS and CTS frames preceding any data or management frame transmission when obtaining a TXOP on the primary channel. In some implementations, in performing the exchange of RTS and CTS frames, process 2800 may involve processor 2712 performing the exchange of RTS and CTS frames in response to at least one of the following: (1) a synchronization timer (if any) not having expired, and (2) a NAV not being updated by receiving a PPDU.

In some implementations, process 2800 may involve processor 2712 performing additional operations. For instance, for each of the plurality of channel segments each having a plurality of channels, process 2800 may involve processor 2712 designating one of the plurality of channels as a primary channel for the respective channel segment to result in a plurality of primary channels for the plurality of channel segments. Additionally, process 2800 may involve processor 2712 designating a first primary channel of the plurality of primary channels as a current primary channel for the operating bandwidth with remaining one or more of the plurality of primary channels being one or more auxiliary primary channels. Moreover, process 2800 may involve processor 2712 detecting that the current primary channel for the operating bandwidth is busy. In response, process 2800 may involve processor 2712 obtaining one other TXOP through a first auxiliary primary channel of the one or more auxiliary primary channels.

In some implementations, in obtaining the other TXOP through the first auxiliary primary channel, process 2800 may involve processor 2712 performing certain operations. For instance, process 2800 may involve processor 2712 performing a respective backoff procedure on the one or more auxiliary primary channels. Additionally, process 2800 may involve processor 2712 obtaining the other TXOP through one of the one or more auxiliary primary channels for which the respective backoff procedure counts down to zero first among all the one or more auxiliary primary channels. Moreover, process 2800 may involve processor 2712 performing a transmission on at least the first auxiliary primary channel.

In some implementations, process 2800 may involve processor 2712 performing additional operations. For instance, for a specific duration, process 2800 may involve processor 2712 designating one of the one or more auxiliary primary channels to be a new primary channel for the operating bandwidth. Moreover, process 2800 may involve processor 2712 changing the current primary channel for the operating bandwidth to be one of the one or more auxiliary primary channels.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    detecting, by a processor of an apparatus, a primary channel busy, with the primary channel being a part of an operating bandwidth having a plurality of channel segments comprising the primary channel and at least one non-primary channel;
    obtaining, by the processor using a backoff counter, a transmission opportunity (TXOP) through a first non-primary channel of the at least one non-primary channel responsive to the detecting; and
    performing, by the processor, a transmission at least on the first non-primary channel during the TXOP,
    wherein the obtaining of the TXOP comprises:
        initiating the TXOP on the first non-primary channel responsive to the backoff counter counting down to zero on the first non-primary channel; and
        determining a bandwidth of the TXOP according to a medium status of each of the at least one non-primary channel other than the first non-primary channel during a specific time interval before a start of the TXOP.

2. The method of claim 1, wherein the obtaining of the TXOP comprises:
    resuming a suspended backoff procedure or initiating a new backoff procedure such that the backoff counter counts down on the first non-primary channel, wherein the specific time interval comprises a point coordination function (PCF) inter-frame space (PIFS) interval.

3. The method of claim 2, wherein the resuming of the suspended backoff procedure or the initiating of the new backoff procedure comprises:
performing one backoff procedure on the first non-primary channel within a selected channel segment; or
performing multiple backoff procedures on multiple non-primary channels of the at least one non-primary channel each within a respective channel segment.

4. The method of claim 2, wherein the initiating of the TXOP comprises:
setting a duration of the TXOP according to duration information obtained from Physical Layer Convergence Procedure (PLCP) protocol data unit (PPDU) length information in a frame received on the primary channel from an overlapping basic service set (OBSS); or
setting the duration of the TXOP to a specified value.

5. The method of claim 1, wherein the obtaining of the TXOP further comprises:
maintaining a first backoff function state for the primary channel;
maintaining a second backoff function state for the first non-primary channel;
performing enhanced distributed channel access (EDCA) backoff on the primary channel;
suspending the EDCA backoff on the primary channel upon detecting that the primary channel is busy; and
storing a value of each of a plurality of backoff parameters of the EDCA backoff on the primary channel as the first backoff function state,
wherein the plurality of backoff parameters comprise at least: the backoff counter, a contention window, and a quality of service (QoS) station (STA) retry counter.

6. The method of claim 1, wherein the at least one non-primary channel comprises a plurality of non-primary channels including the first non-primary channel, and wherein the obtaining of the TXOP further comprises:
invoking at least one backoff procedure by invoking a respective backoff procedure of the at least one backoff procedure on a corresponding one of the plurality of non-primary channels; and
selecting the first non-primary channel on which to initiate the TXOP responsive to the respective backoff procedure on the first non-primary channel counting down to zero first among the plurality of non-primary channels.

7. The method of claim 6, wherein the invoking of the at least one backoff procedure comprises invoking the at least one backoff procedure in parallel or sequentially by initializing at least one new backoff procedure or resuming a suspended backoff procedure on the primary channel.

8. The method of claim 6, wherein, in an event that the invoking of the at least one backoff procedure comprises resuming the suspended backoff procedure, a respective backoff counter of each of the at least one backoff procedure is initialized based on a first backoff function state for the primary channel.

9. The method of claim 6, wherein, in an event that the invoking of the at least one backoff procedure comprises initializing a new backoff procedure for the first non-primary channel, a respective backoff counter of each of the at least one backoff procedure is initialized based on an access category.

10. The method of claim 6, wherein a second backoff function state for the first non-primary channel is reset, and wherein a previously stored first backoff function state is restored on the primary channel at the end of the TXOP obtained on the first non-primary channel.

11. The method of claim 1, wherein the performing of the exchange of RTS and CTS frames comprises performing the exchange of RTS and CTS frames responsive to at least one of:
a synchronization timer not having expired, and
a network allocation vector (NAV) not being updated by receiving a Physical Layer Convergence Procedure (PLCP) protocol data unit (PPDU).

12. The method of claim 1, further comprising:
for each of the plurality of channel segments each having a plurality of channels, designating one of the plurality of channels as a primary channel for the respective channel segment to result in a plurality of primary channels for the plurality of channel segments;
designating a first primary channel of the plurality of primary channels as a current primary channel for the operating bandwidth with remaining one or more of the plurality of primary channels being one or more auxiliary primary channels;
detecting that the current primary channel for the operating bandwidth is busy; and
responsive to the detecting, obtaining one other TXOP through a first auxiliary primary channel of the one or more auxiliary primary channels.

13. The method of claim 12, wherein the obtaining of the other TXOP through the first auxiliary primary channel comprises:
performing a respective backoff procedure on the one or more auxiliary primary channels;
obtaining the other TXOP through one of the one or more auxiliary primary channels for which the respective backoff procedure counts down to zero first among all the one or more auxiliary primary channels; and
performing a transmission on at least the first auxiliary primary channel.

14. The method of claim 12, further comprising:
for a specific duration:
designating one of the one or more auxiliary primary channels to be a new primary channel for the operating bandwidth; and
changing the current primary channel for the operating bandwidth to be one of the one or more auxiliary primary channels.

15. An apparatus, comprising:
a transceiver configured to communicate wirelessly; and
a processor coupled to the transceiver and configured to perform, via the transceiver, operations comprising:
detecting a primary channel busy, with the primary channel being a part of an operating bandwidth having a plurality of channel segments comprising the primary channel and at least one non-primary channel;
obtaining, by using a backoff counter, a transmission opportunity (TXOP) through a first non-primary channel of the at least one non-primary channel responsive to the detecting; and
performing a transmission at least on the first non-primary channel during the TXOP,
wherein the obtaining of the TXOP comprises:
resuming a suspended backoff procedure or initiating a new backoff procedure such that the backoff counter counts down on the first non-primary channel; and initiating the TXOP on the first non-primary channel responsive to the backoff counter counting down to zero on the first non-primary channel.

16. The apparatus of claim 15, wherein the obtaining of the TXOP further comprises:
   determining a bandwidth of the TXOP according to a medium status of each of the at least one non-primary channel other than the first non-primary channel during a specific time interval before a start of the TXOP,
   wherein the specific time interval comprises a point coordination function (PCF) inter-frame space (PIFS) interval.

17. The apparatus of claim 16, wherein the resuming of the suspended backoff procedure or the initiating of the new backoff procedure comprises:
   performing one backoff procedure on the first non-primary channel within a selected channel segment; or
   performing multiple backoff procedures on multiple non-primary channels of the at least one non-primary channel each within a respective channel segment.

18. The apparatus of claim 16, wherein the initiating of the TXOP comprises:
   setting a duration of the TXOP according to duration information obtained from Physical Layer Convergence Procedure (PLCP) protocol data unit (PPDU) length information in a frame received on the primary channel from an overlapping basic service set (OBSS); or
   setting the duration of the TXOP to a specified value.

19. The apparatus of claim 15, wherein the processor is further configured to perform operations comprising:
   for each of the plurality of channel segments each having a plurality of channels, designating one of the plurality of channels as a primary channel for the respective channel segment to result in a plurality of primary channels for the plurality of channel segments;
   designating a first primary channel of the plurality of primary channels as a current primary channel for the operating bandwidth with remaining one or more of the plurality of primary channels being one or more auxiliary primary channels;
   detecting that the current primary channel for the operating bandwidth is busy; and
   responsive to the detecting, obtaining one other TXOP through a first auxiliary primary channel of the one or more auxiliary primary channels.

20. The apparatus of claim 19, wherein the obtaining of the other TXOP through the first auxiliary primary channel comprises:
   performing a respective backoff procedure on the one or more auxiliary primary channels;
   obtaining the other TXOP through one of the one or more auxiliary primary channels for which the respective backoff procedure counts down to zero first among all the one or more auxiliary primary channels; and
   performing a transmission on at least the first auxiliary primary channel.

* * * * *